(12) United States Patent
Hasegawa

(10) Patent No.: US 7,406,213 B2
(45) Date of Patent: Jul. 29, 2008

(54) IMAGE PROCESSING APPARATUS AND METHOD, AND COMPUTER PROGRAM

(75) Inventor: Yuichi Hasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 586 days.

(21) Appl. No.: 10/981,103

(22) Filed: Nov. 4, 2004

(65) Prior Publication Data

US 2005/0169555 A1    Aug. 4, 2005

(30) Foreign Application Priority Data

Nov. 7, 2003    (JP)    ............... 2003-377797

(51) Int. Cl.
- G06K 9/36    (2006.01)
- G06K 9/00    (2006.01)
- G03F 3/08    (2006.01)
- H04N 7/00    (2006.01)

(52) U.S. Cl. .................. 382/284; 382/167; 348/36; 358/521

(58) Field of Classification Search ............ 382/162, 382/167–169, 254, 284, 274; 701/1; 345/427, 345/629; 348/36; 358/1.9, 3.21, 450, 518–522
See application file for complete search history.

(56) References Cited

U.S. PATENT DOCUMENTS

| | | | | |
|---|---|---|---|---|
| 5,383,032 A | * | 1/1995 | Eguchi et al. ............... | 358/448 |
| 6,831,643 B2 | * | 12/2004 | Aliaga et al. ................ | 345/427 |
| 7,009,733 B2 | * | 3/2006 | Gruzdev et al. .............. | 358/1.9 |
| 7,023,580 B2 | * | 4/2006 | Zhang et al. ................. | 358/1.9 |
| 2003/0158838 A1 | * | 8/2003 | Okusa ........................... | 707/1 |
| 2005/0231605 A1 | * | 10/2005 | Nakami et al. ........... | 348/222.1 |

FOREIGN PATENT DOCUMENTS

| | | |
|---|---|---|
| JP | 05-342344 | 12/1993 |
| JP | 2000-092306 | 3/2000 |
| JP | 2001-169151 | 6/2001 |

* cited by examiner

*Primary Examiner*—Kanji Patel
(74) *Attorney, Agent, or Firm*—Finnegan, Henderson, Farabow, Garrett & Dunner, L.L.P.

(57) ABSTRACT

A representative point for pixel value adjustment at which the same pixel value is to be set is selected from each of a correction image to be corrected and a reference image of a mosaic image. A tone curve that defines an output pixel value with respect to an input pixel value is generated by a line that passes through a pixel-value-conversion coordinate point defined by pixel values indicating the representative points selected from the correction image and the reference image, which are set as input and output values. This line is generated by a spline curve. The pixel value of the correction image is converted based on the generated tone curve.

17 Claims, 18 Drawing Sheets

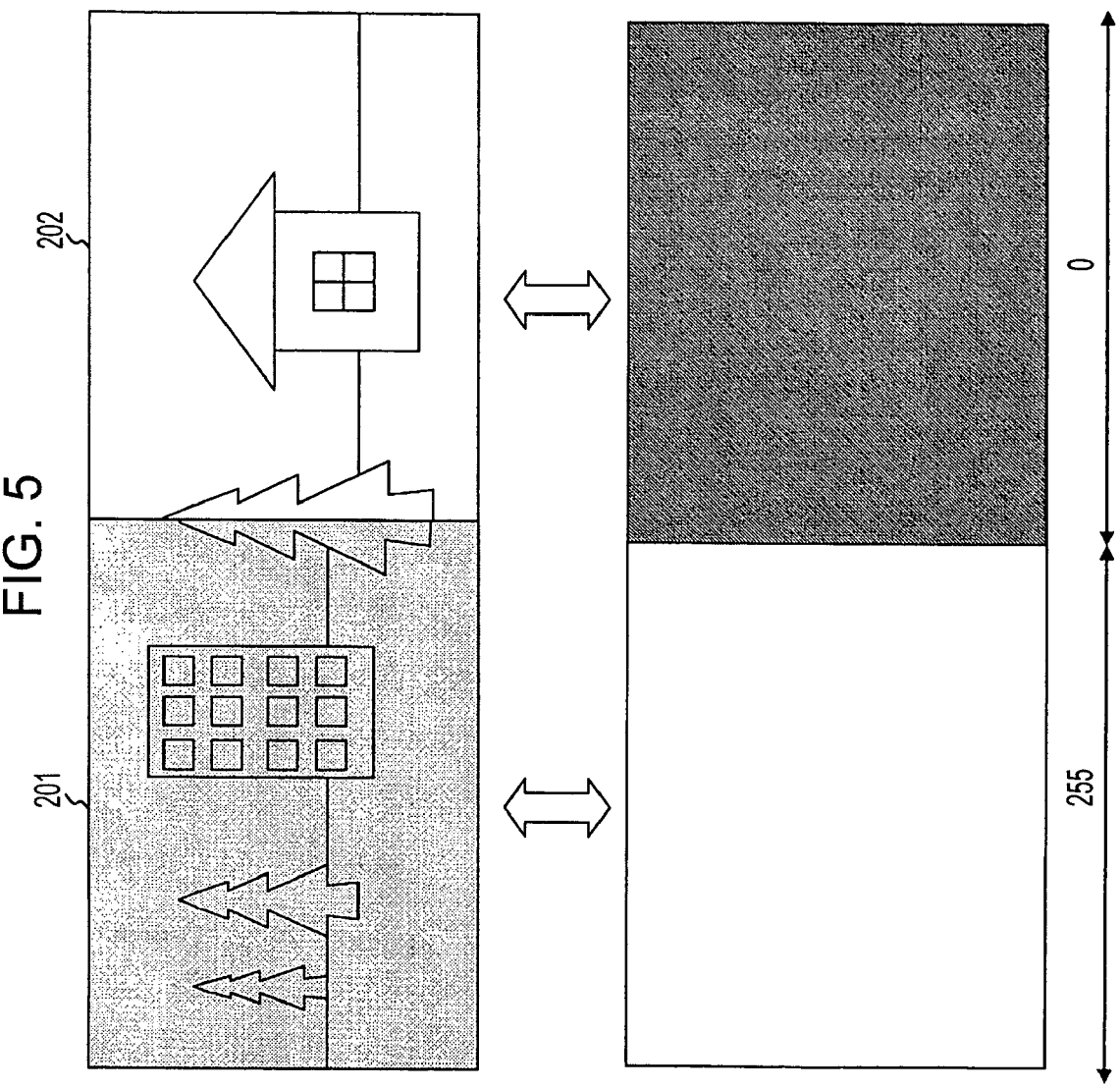

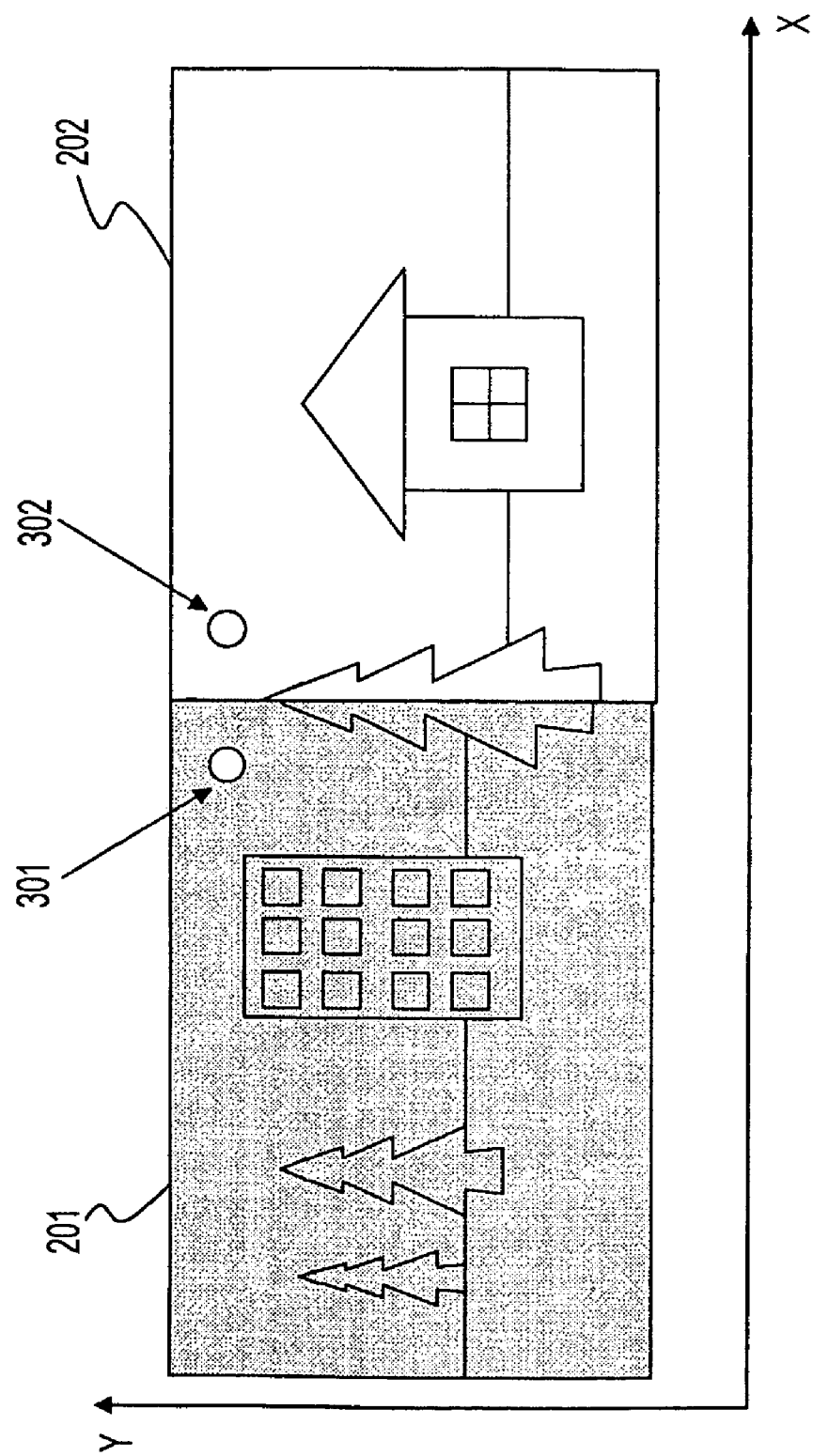

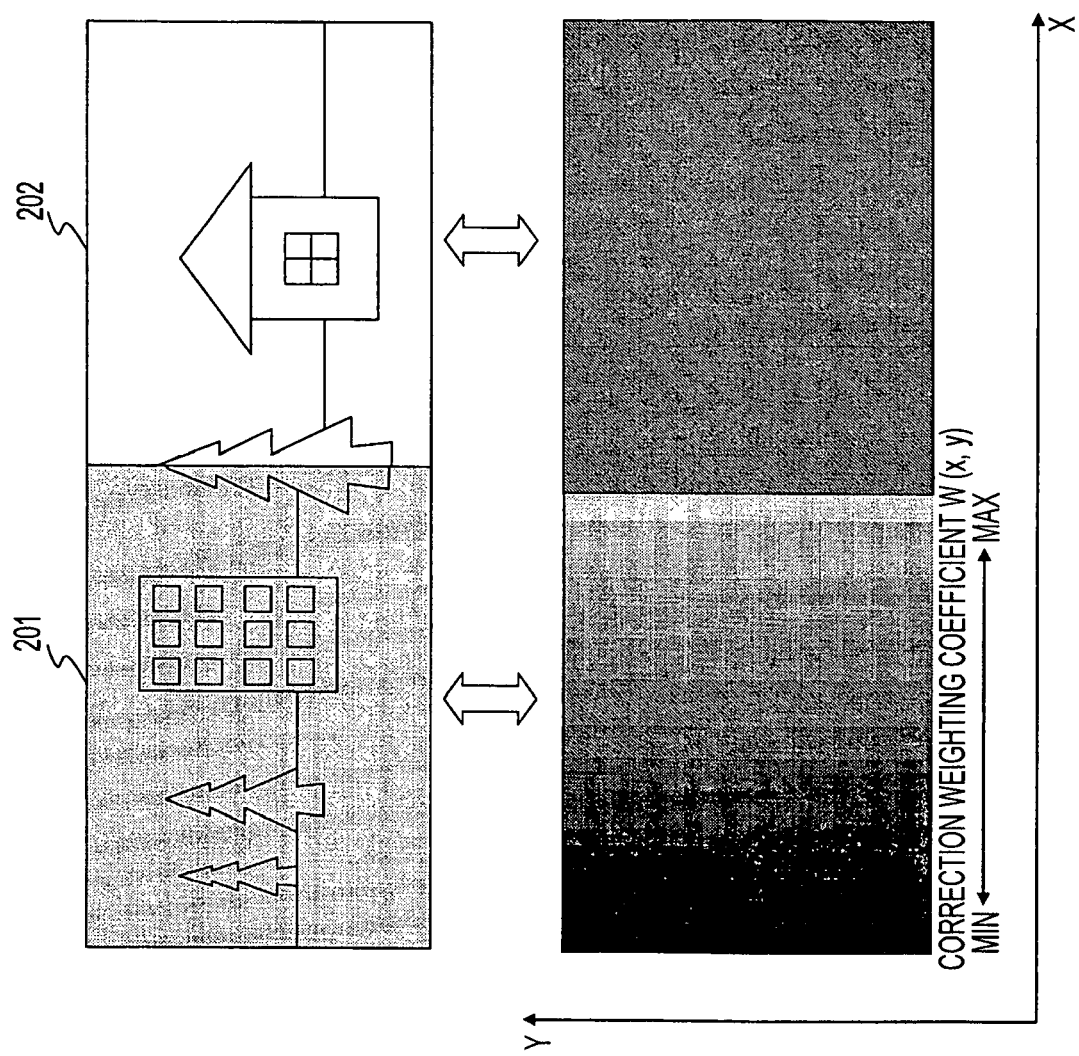

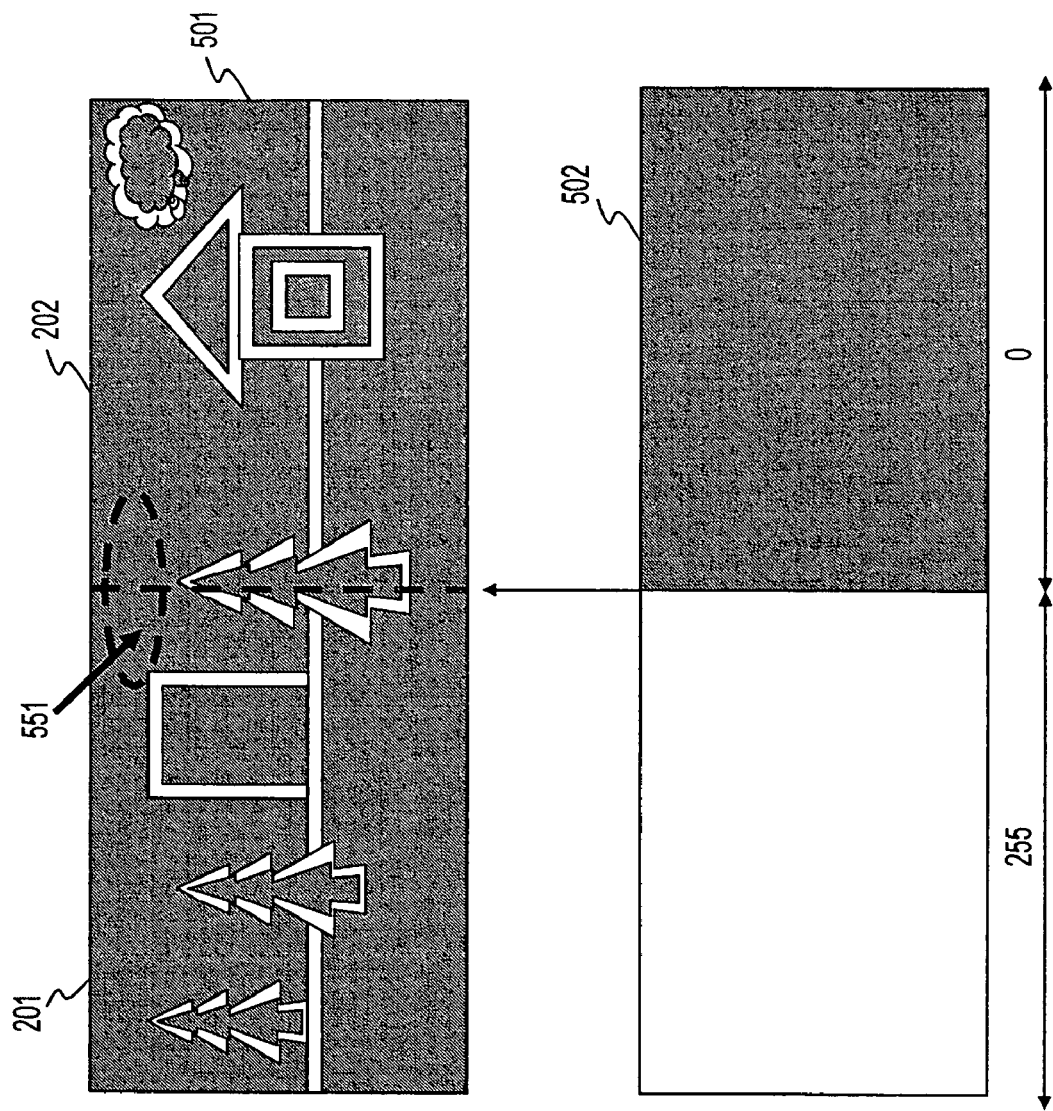

IMAGE PROCESSING APPARATUS AND METHOD, AND COMPUTER PROGRAM

BACKGROUND OF THE INVENTION

1. Field of the Invention

The present invention relates to an image processing apparatus and method and a computer program. More specifically, the present invention relates to an image processing apparatus and method for correcting for color variations in a mosaic image (multi-view image) produced by joining a plurality of images photographed from different viewpoints, and to a computer program.

2. Description of the Related Art

Panoramic pictures or star maps are produced by joining camera pictures photographed from different viewpoints. An object may be photographed from different viewpoints using a single camera or a plurality of cameras.

An object may be photographed using a single camera that is manually or automatically pointed in many directions to obtain multi-view images of the object, and the images may then be joined. In this case, the object is not photographed from a plurality of viewpoints at the same time. Thus, basically, an object is photographed using a single camera under the condition that the object is stationary.

However, when the photographic environment, e.g., the lighting conditions, changes while photographing a stationary object, changes in hue occur in the photographed images. In a picture, such as a panoramic picture, produced by joining the images including such changes in hue, the boundaries of the joined images become noticeable.

In another method, an object is photographed using a plurality of cameras that are pointed in different directions from a plurality of viewpoints at the same time, and the plurality of photographed images are then joined. In this method, a moving object can be photographed, which is not possible by using a single camera; however, a problem of color variations due to the difference among the cameras still exists.

Due to the difference in characteristics of, for example, a lens, a data capturing unit, and a memory, and the difference in image processing parameters of the cameras, the same object photographed using the cameras is not stored as the object having the same color data. In a composite picture in which these images are merged, therefore, the difference in hue among the images becomes noticeable.

At boundaries of the joined images, unnatural discontinuous color fields appear, and the image boundaries are exaggerated. Thus, a high-quality mosaic image, such as a panoramic picture, cannot be obtained. In particular, a composite picture made using a plurality of cameras having different characteristics is more susceptible to such color variations, which are not negligible compared to the change in hue caused as the single-camera environment changes over time.

In order to overcome color variations in a mosaic image produced by joining a plurality of photographed pictures, one known approach is to superpose and average the overlapping regions. This approach will be described with reference to FIGS. 1A to 1C.

FIGS. 1A and 1B show pictures of an object photographed from different viewpoints, and FIG. 1C shows a panoramic picture produced based on the pictures shown in FIGS. 1A and 1B. The object is photographed so that the pictures shown in FIGS. 1A and 1B include an identical object scene region, called an "overlapping region".

The pictures shown in FIGS. 1A and 1B include overlapping regions 11 and 12 indicating an identical scene region.

When the panoramic picture shown in FIG. 1C is produced as a mosaic image based on the pictures shown in FIGS. 1A and 1B, color correction is performed so that an overlapping region 21 in the panoramic picture shown in FIG. 1C has the mean color value of the overlapping regions 11 and 12 of the pictures shown in FIGS. 1A and 1B. This color correction results in a panoramic picture in which boundaries of the adjacent pictures are not noticeable.

Color correction may be performed using a technique other than such a simple pixel-averaging correction. Correction using a weighting and averaging procedure may be performed, taking distances 31 and 32 from the pictures into account, so that the amount of pixel value correction can vary depending upon the distances 31 and 32.

A variety of image processing procedures based on "overlapping regions" are disclosed in the art. For example, Japanese Unexamined Patent Application Publication No. 5-342344 discloses that color conversion is performed using an overlapping region so that color histograms of two color images for the overlapping region are matched, to thereby match the hue of the two images.

Japanese Unexamined Patent Application Publication No. 2000-92306 discloses a method for compositing two CCD images including an overlapping portion at the image boundaries, in which the amount of offset in a mean value of pixel data histograms of the two images for the overlapping portion is added to the images, thereby reducing color variations in the boundaries of the joined images.

Japanese Unexamined Patent Application Publication No. 2001-169151 discloses that a plurality of images photographed using a single camera so as to include an overlapping region are joined to form a composite image that is less noticeable at the boundaries of the joined images by adjusting the hue, brightness, etc., at the boundaries.

In the "overlapping region"-based correction disclosed in the above-noted publications, adjacent images must include an identical scene region or an "overlapping region." Without an "overlapping region," correction cannot be performed. A larger overlapping region is required for correcting for worse color variations between adjacent images. If the "overlapping region" is small, it is difficult to accurately perform correction.

SUMMARY OF THE INVENTION

Accordingly, it is an object of the present invention to provide an image processing apparatus and method for performing accurate color correction for photographed images to produce a high-quality mosaic image if adjacent images do not include an identical object scene region or an "overlapping region", and to provide a computer program.

In one aspect, the present invention provides an image processing apparatus that generates a mosaic image in which a plurality of images are connected. The mosaic image including a reference image and a correction image to be corrected. The apparatus includes an image processing unit that corrects a pixel value of the correction image based on the reference image. The image processing unit determines a tone curve that defines an output pixel value with respect to an input pixel value, and converts the pixel value of the correction image using the tone curve. The tone curve is generated so as to pass through a pixel-value-conversion coordinate point that is defined by a correction-image pixel value and a reference-image pixel value set as input and output values, the correction-image pixel value constituting a pixel-value-adjustment representative point that is selected from the correction image, the reference-image pixel value constituting a pixel-value-adjustment representative point that is selected from the reference image, the pixel-value-adjustment representative points selected from the correction image and the reference image being points at which the same pixel value is to be set. The pixel value of the correction image is converted based on the generated tone curve.

The image processing unit may generate a spline curve that passes through the pixel-value-conversion coordinate point as a control point, and may convert the pixel value of the correction image using the spline curve as a tone curve.

The image processing unit may generate a plurality of spline curves that individually pass through a plurality of pixel-value-conversion coordinate points, and may convert the pixel value of the correction image based on a tone curve generated by connecting the plurality of spline curves.

The image processing unit may connect a plurality of pixel-value-conversion coordinate points by a line to generate a tone curve, and may convert the pixel value of the correction image based on the generated tone curve.

The image processing unit may generate coordinate-point connecting lines individually connecting a plurality of pixel-value-conversion coordinate points by means of weighting and averaging depending upon the distance from the pixel-value-conversion coordinate points, and may convert the pixel value of the correction image based on a tone curve including the generated coordinate-point connecting lines.

The image processing unit may generate a correction weighting coefficient for a pixel value of the correction image depending upon the distance from a connected portion with the reference image, and may change the amount of pixel value conversion based on the tone curve according to the correction weighting coefficient. The amount of pixel value conversion based on the tone curve may be reduced for a pixel value of the correction image farther away from the connected portion with the reference image.

The image processing unit may determine an output pixel value $G(x_\alpha, y_\alpha)$ of the correction image by the following equation:

$$G(x_\alpha, y_\alpha) = [w(x_\alpha, y_\alpha) \times T(F(x_\alpha, y_\alpha))] + [(1 - w(x_\alpha, y_\alpha)) \times F(x_\alpha, y_\alpha)]$$

where $F(x_\alpha, y_\alpha)$ denotes an input pixel value of the correction image, $w(x_\alpha, y_\alpha)$ denotes the correction weighting coefficient for each pixel of the correction image, and T denotes a pixel value conversion function using the tone curve.

The image processing unit may detect an identical-pixel-value-setting region based on an edge image, and may select the pixel-value-adjustment representative points from the detected identical-pixel-value-setting region. The identical-pixel-value-setting region may be a region where the same pixel value can be set in the correction image and the reference image. The edge image may correspond to the image in which the reference image and the correction image are connected.

In another aspect, the present invention provides an image processing method for generating a mosaic image in which a plurality of images are connected, the mosaic image including a reference image and a correction image to be corrected. The method includes a tone curve determining step of determining a tone curve that defines an output pixel value with respect to an input pixel value, the tone curve being generated by a line that passes through a pixel-value-conversion coordinate point that is defined by a correction-image pixel value and a reference-image pixel value set as input and output values, the correction-image pixel value constituting a pixel-value-adjustment representative point that is selected from the correction image, the reference image pixel value constituting a pixel-value-adjustment representative point that is selected from the reference image, the pixel-value-adjustment representative points selected from the correction image and the reference image being points at which the same pixel value is to be set, and a pixel value converting step of converting the pixel value of the correction image based on the tone curve.

The tone curve determining step may determine a spline curve that passes through the pixel-value-conversion coordinate point as a control point. The pixel value converting step may convert the pixel value of the correction image using the spline curve as a tone curve.

The tone curve determining step may determine a plurality of spline curves that individually pass through a plurality of pixel-value-conversion coordinate points, and generates a tone curve by connecting the plurality of spline curves. The pixel value converting step may convert the pixel value of the correction image based on the generated tone curve.

The tone curve determining step may connect a plurality of pixel-value-conversion coordinate points by a line to generate a tone curve. The pixel value converting step may convert the pixel value of the correction image based on the generated tone curve.

The tone curve determining step may generate coordinate-point connecting lines individually connecting a plurality of pixel-value-conversion coordinate points by means of weighting and averaging depending upon the distance from the pixel-value-conversion coordinate points, and may generate a tone curve including the generated coordinate-pint connecting lines. The pixel value converting step may convert the pixel value of the correction image based on the generated tone curve.

The method may further include the steps of generating a correction weighting coefficient for a pixel value of the correction image depending upon the distance from a connected portion with the reference image, and changing the amount of pixel value conversion based on the tone curve according to the correction weighting coefficient. The amount of pixel value conversion based on the tone curve may be reduced for a pixel value of the correction image farther away from the connected portion with the reference image.

The method may further include the step of determining an output pixel value $G(x_\alpha, y_\alpha)$ of the correction image by the following equation:

$$G(x_\alpha, y_\alpha) = [w(x_\alpha, y_\alpha) \times T(F(x_\alpha, y_\alpha))] + [(1 - w(x_\alpha, y_\alpha)) \times F(x_\alpha, y_\alpha)]$$

where $F(x_\alpha, y_\alpha)$ denotes an input pixel value of the correction image, $w(x_\alpha, y_\alpha)$ denotes the correction weighting coefficient for each pixel of the correction image, and T denotes a pixel value conversion function using the tone curve.

The method may further include the step of detecting an identical-pixel-value-setting region based on an edge image, the identical-pixel-value-setting region being a region where the same pixel value can be set in the correction image and the reference image, the edge image corresponding to the image in which the reference image and the correction image are connected. The method may further include the step of selecting the pixel-value-adjustment representative points from the detected identical-pixel-value-setting region.

In another aspect, the present invention provides a computer program for generating a mosaic image in which a plurality of images are connected, the mosaic image including a reference image and a correction image to be corrected. The computer program includes a tone curve determining step of determining a tone curve that defines an output pixel value with respect to an input pixel value, the tone curve being generated by a line that passes through a pixel-value-conversion coordinate point that is defined by a correction-image pixel value and a reference-image pixel value set as input and output values, the correction-image pixel value constituting a pixel-value-adjustment representative point that is selected from the correction image, the reference-image pixel value constituting a pixel-value-adjustment representative point that is selected from the reference image, the pixel-value-adjustment representative points selected from the correction image and the reference image being points at which the same pixel value is to be set, and a pixel value converting step of converting the pixel value of the correction image based on the tone curve.

The computer program of the present invention may be a computer program that can be provided in a computer-readable format by means of a storage medium or a communication medium to a computer system capable of executing various types of program code, e.g., a recording medium such as a CD, an FD, or an MO, or a communication medium such as a network. Such a computer-readable program allows processing in accordance with the program on the computer system.

According to the present invention, in an image processing apparatus and method for generating a mosaic image in which a plurality of images are connected, a tone curve that defines an output pixel value with respect to an input pixel value is generated by a line that passes through a pixel-value-conversion coordinate point defined by a correction-image pixel value and a reference-image pixel value set as input and output values. The correction-image pixel value and the reference-image pixel value each constitute pixel-value-adjustment representative points selected from a correction image to be corrected and a reference image of the mosaic image, at which the same pixel value is to be set. The pixel value of the correction image is converted using the generated tone curve. Therefore, accurate pixel value correction can be performed on an image including no overlapping image region, and a high-quality mosaic image can be produced. The mechanism of the present invention is applied to, for example, an apparatus for generating a compote image in which images photographed from a plurality of viewpoints are connected, such as a panoramic picture or a star map, thus achieving high-quality image generation.

According to the present invention, furthermore, a line that passes through a pixel-value-conversion coordinate point defined by a correction-image pixel value and a reference-image pixel value set as input and output values, the correction-image pixel value and the reference-image pixel value each constituting pixel-value-adjustment representative points selected from a correction image to be corrected and a reference image of the mosaic image, at which the same pixel value is to be set, is generated by, for example, a spline curve. Thus, any pixel value can be smoothly converted, and the corrected image become natural, resulting in a high-quality mosaic image. The mechanism of the present invention is applied to, for example, an apparatus for generating a composite image in which images photographed from a plurality of viewpoints are connected, such as a panoramic picture or a star map, thus achieving high-quality image generation.

According to the present invention, furthermore, a correction weighting coefficient for a pixel value of a correction image is generated depending upon the distance from a connected portion with a reference image, and the amount of pixel value conversion based on a tone curve is changed according to the correction weighting coefficient. The amount of pixel value conversion based on the tone curve is reduced for a pixel value of the correction image farther away from the connected portion with the reference image. Thus, a seamless mosaic image can be obtained, in which the original pixel value is used in a portion of the correction image farther away from the reference image. The mechanism of the present invention is applied to, for example, an apparatus for generating a composite image in which images photographed from a plurality of viewpoints are connected, such as a panoramic picture or a star map, thus achieving high-quality image generation.

According to the present invention, furthermore, a process for selecting a pixel-value-adjustment representative point at which the same pixel value is to be set from each of the correction image and the reference image of the mosaic image can be automatically performed using an edge image. Therefore, a high-quality mosaic image can be generated without intervention of the operator. The mechanism of the present invention is applied to, for example, an apparatus for generating a composite image in which images photographed from a plurality of viewpoints are connected, such as a panoramic picture or a star map, thus achieving efficient high-quality image generation.

Other objects, features, and advantages of the present invention will become apparent from the following detailed description of the present invention taken in conjunction with the accompanying drawings. In this document, the term system means a logical set of a plurality of apparatuses, and these apparatuses are not necessarily housed in the same housing.

BRIEF DESCRIPTION OF THE DRAWINGS

FIG. 5 is an illustration of composite image data associated with blend information;

FIG. 7 is an illustration of pixel-value-adjustment representative points selected in a composite image;

FIG. 14 is an illustration showing a process for setting a correction weighting coefficient depending upon the distance from a joined portion;

FIG. 16 is an illustration showing a process for determining a representative point selection region;

DESCRIPTION OF THE PREFERRED EMBODIMENTS

An image processing apparatus and method and a computer program according to the present invention will be described in detail with reference to the drawings.

First Embodiment

Figure 1B:
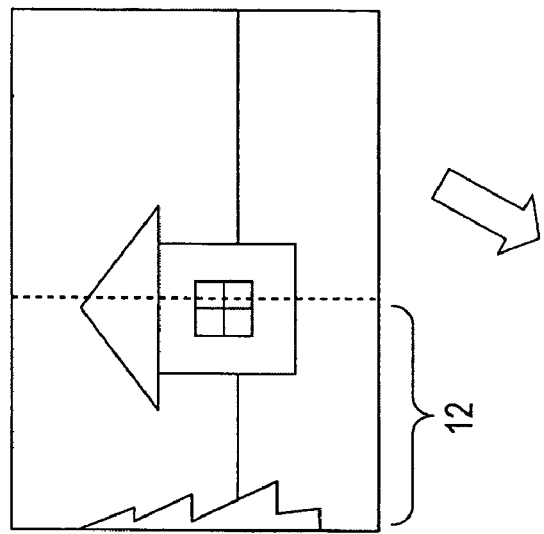
FIGS. 1A to 1C are illustrations of two pictures including an overlapping region, and a panoramic picture produced by superposing and averaging of the overlapping region.
Figure 1A:
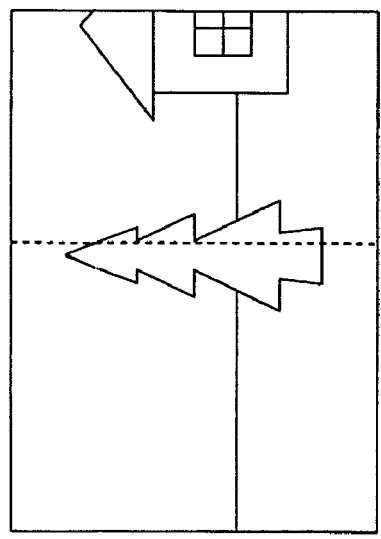
Figure 1C:
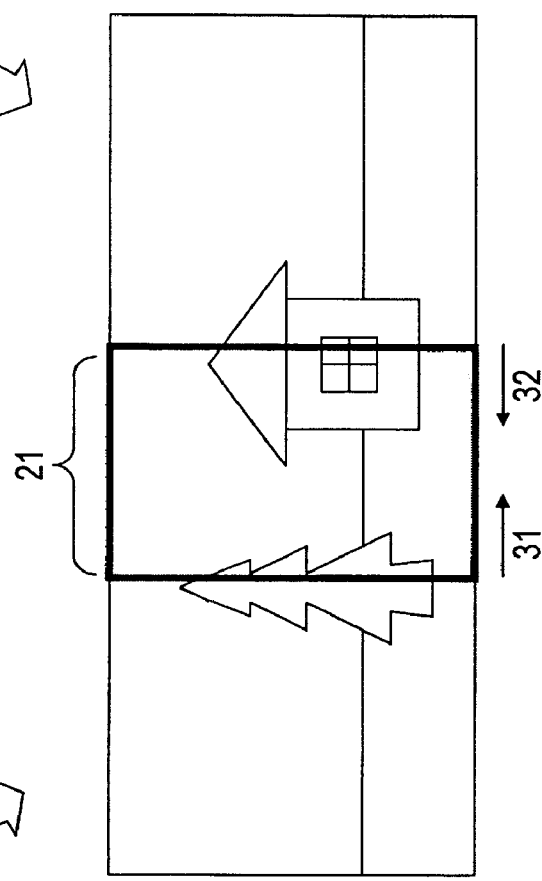
Figure 2:
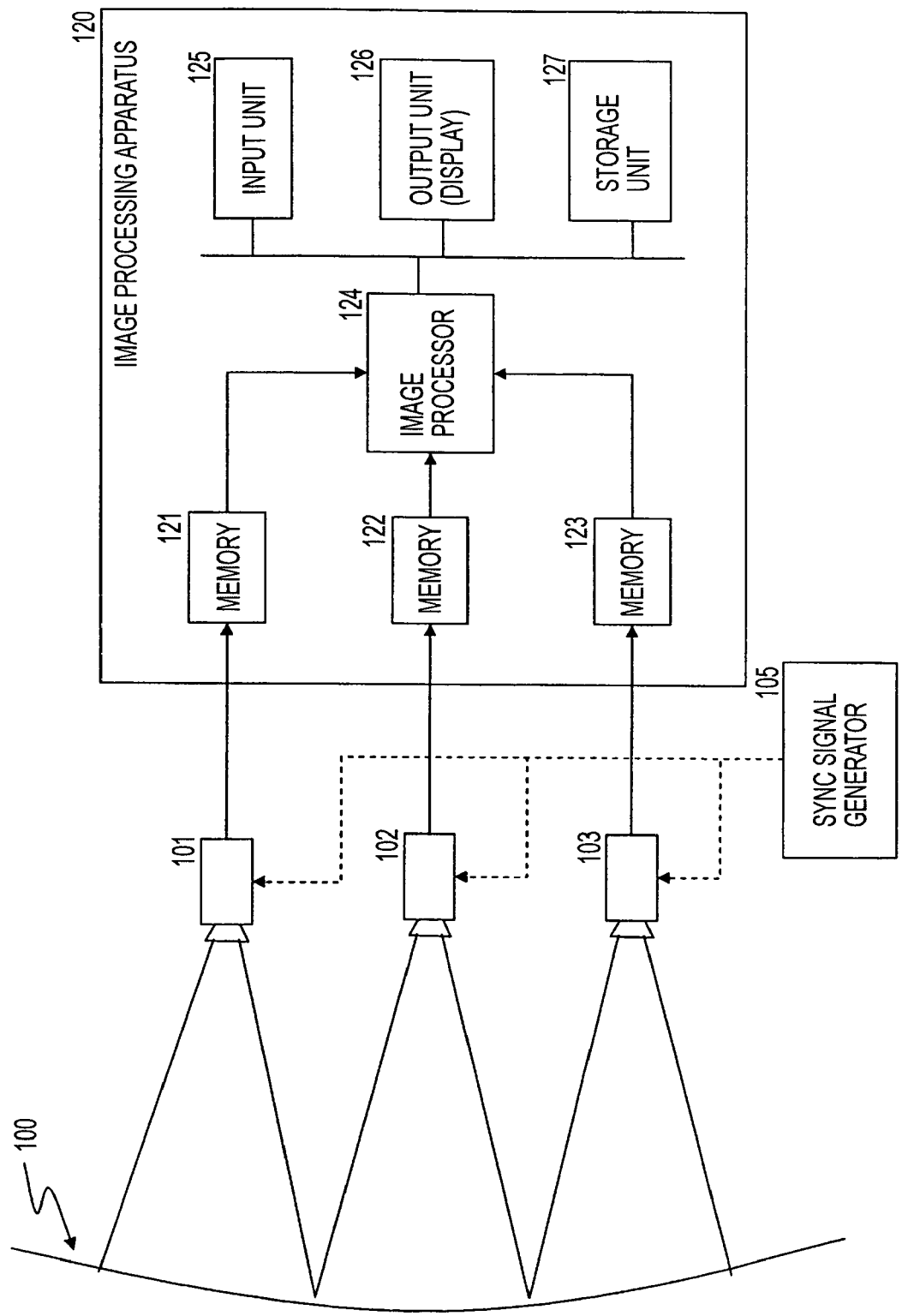
FIG. 2 is a block diagram of an image processing apparatus according to the present invention for capturing photographed images.

FIG. 2 is a block diagram of an image processing apparatus according to the present invention for capturing photographed images.

An object 100 is photographed using a plurality of cameras 101 to 103. The cameras 101 to 103 photograph the object in different object scene regions. For example, the cameras 101 to 103 receive a sync signal output from a sync signal generator 105, and the photographing timing of the cameras 101 to 103 is controlled. Although three cameras are shown in FIG. 2, the present invention is applicable to processing of images photographed from a plurality of different viewpoints, and any number of cameras may be used. The present invention is also applicable to processing of a plurality of images photographed using a single camera while sequentially changing the viewpoint. In the first embodiment, images photographed using a plurality of different cameras are processed, by way of example.

An image processing apparatus 120 receives image data from a plurality of different viewpoints, and merges the plurality of photographed images to produce a mosaic image, e.g., a panoramic picture.

The cameras 101 to 103 may be still cameras that photograph still images, or digital video cameras that photograph video data. The image processing apparatus 120 merges photographed images of the still cameras to produce a panoramic still image, or merges synchronous frame images based on the pictures input from the digital video cameras to produce a panoramic picture.

The cameras 101 to 103 differ from each other, and when the same object is photographed using the cameras 101 to 103, the photographed color images are not the same. That is, due to the difference in characteristics of, for example, a lens, a data capturing unit, and a memory, and the difference in image processing parameters of the cameras 101 to 103, the photographed color images of the same object are not the same. For example, when the cameras 101 to 103 record 8-bit data (0 to 255) for each of R, G, and B color components in association with each pixel, the R, G, and B data recorded in the cameras 101 to 103 often have different values even if the same object is photographed using the cameras 101 to 103.

The image processing apparatus 120 of the present invention corrects the different image data to produce a high-quality seamless mosaic image.

The image processing apparatus 120 of the present invention performs an accurate image correction, and produces a high-quality mosaic image if the images photographed using the cameras 101 to 103 do not include an overlapping region.

The image processing apparatus 120 stores the photographed image data of the cameras 101 to 103 in memories 121 to 123, respectively. An image processor 124 performs image processing in accordance with a predetermined image correcting procedure to produce a mosaic image in which the plurality of images are joined. In this image processing, characteristics of the images to be joined are analyzed for pixel value correction.

The image processor 124 includes a central processing unit (CPU) serving as a controller for performing image processing. The image processor 124 performs image processing, including pixel value correction, according to a computer program for performing an image processing procedure stored in, for example, a storage unit 127, and produces a high-quality seamless mosaic image.

The image processing apparatus 120 further includes an input unit 125 including a keyboard, a mouse, etc., and an output unit 126 including a display, etc.

Figure 3:
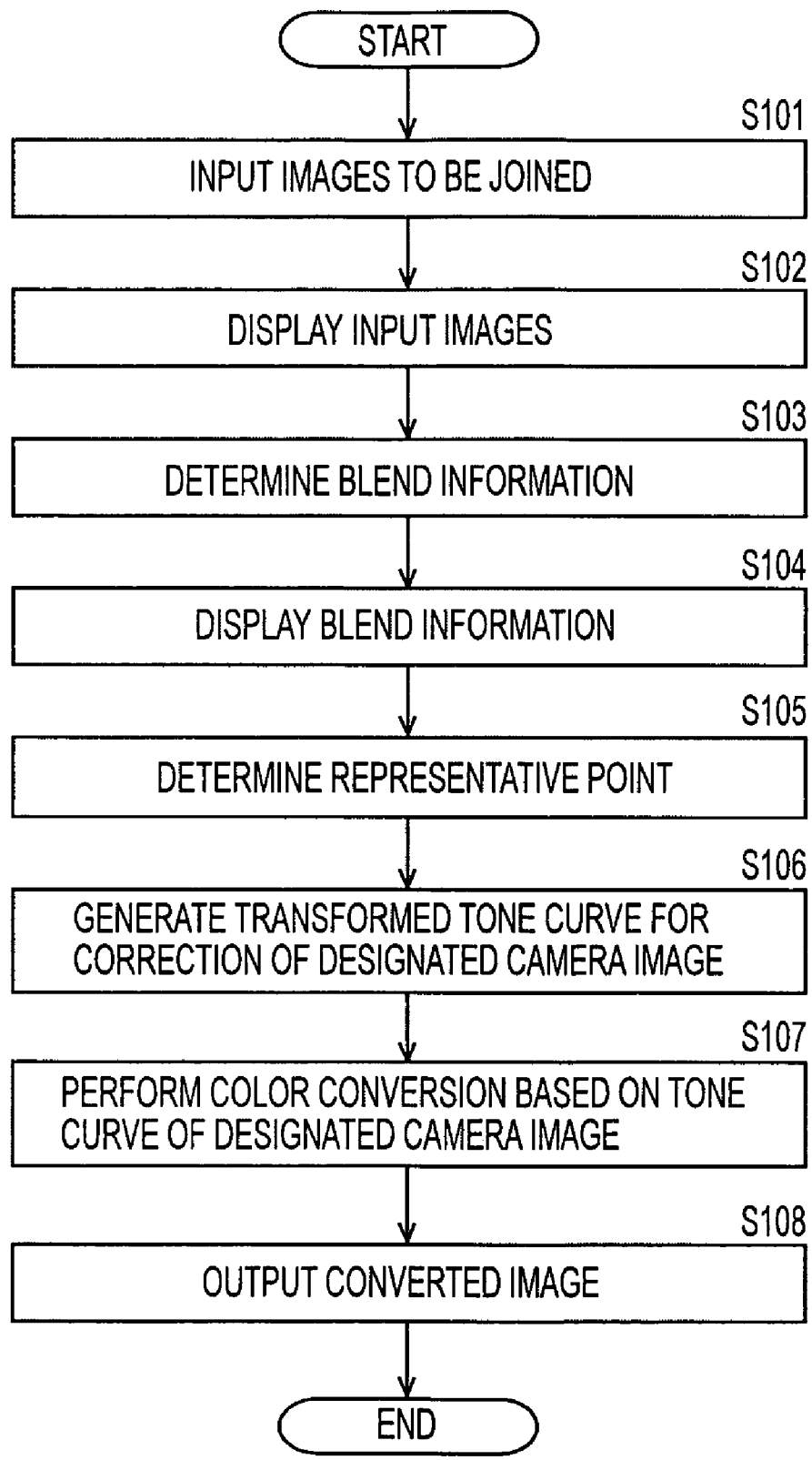
FIG. 3 is a flowchart showing an image processing process for the image processing apparatus according to the present invention.

FIG. 3 is a flowchart showing an image processing procedure performed in the image processing apparatus of the present invention.

In step S101, data of two images to be joined is input. The input image data is adjacent image data having no overlapping region. The image data may be still image data, or synchronous frame image data of video data.

The image to be processed by the image processing apparatus of the present invention is not limited to an image photographed using a camera, and may be an image captured by a scanner or the like.

In step S102, the input adjacent images are displayed. The displaying steps S102 and S104 shown in FIG. 3 are performed for confirmation of the operator, and may be omitted.

Figure 4B:
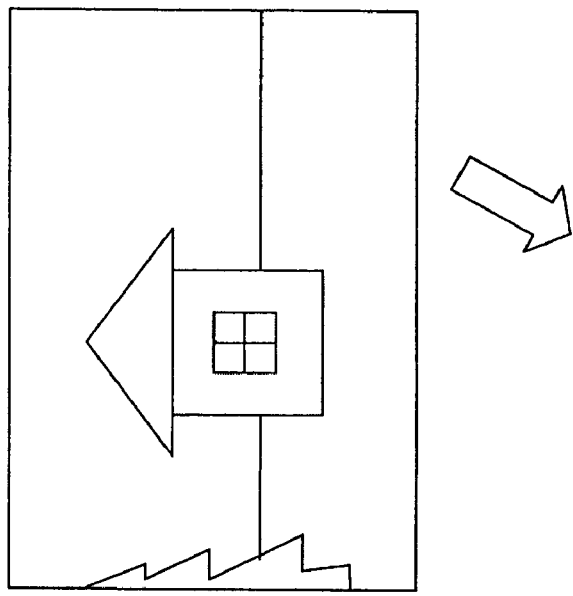
FIGS. 4A to 4C are illustrations of image data and composite image data produced by connecting the image data.
Figure 4A:
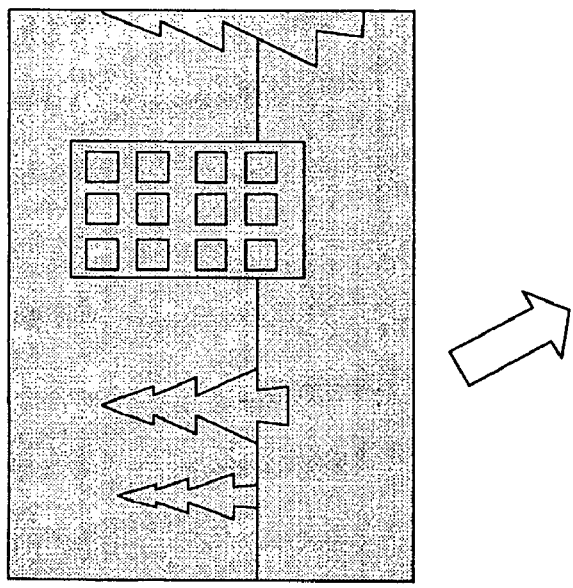

The images displayed in step S102 are shown in FIGS. 4A and 4B. The image data shown in FIGS. 4A and 4B are photographed using two cameras, and are joined without correction to form composite image data or a mosaic image shown in FIG. 4C.

Figure 4C:
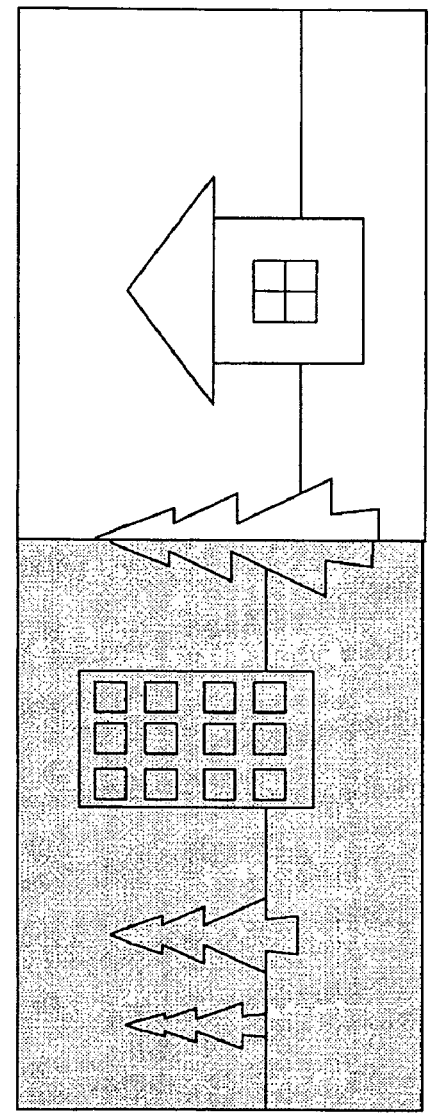

Due to the difference in camera characteristics or photographic environments, the photographed images shown in FIGS. 4A and 4B have different hues. For example, the image shown in FIG. 4A may be redder than the image shown in FIG. 4B. In the composite image data shown in FIG. 4C, therefore, the boundary of the joined images is clearly perceptible, and it is perceived that the composite image data shown in FIG. 4C is constructed by a plurality of joined images.

In the processing after step S103 shown in FIG. 3, the image data is corrected.

In step S103, blend information that defines an image data region to be corrected is determined. The blend information will be described with reference to FIG. 5.

FIG. 5 shows composite image data associated with blend information. The composite image data includes a designated camera image 201 to be corrected and a reference image 202. The designated camera image 201 is corrected based on characteristics of the reference image 202.

The blend information is grayscale information having, for example, brightness values 0 to 255. The minimum brightness value 0 (i.e., black) is allocated to an image data region that does not require pixel value correction. In FIG. 5, the reference image 202 has a blend information value of the minimum brightness value 0 (black). The pixel value correction region, that is, the designated camera image 201 in the composite image data, has a blend information value of brightness value 255 (white).

Figure 6:
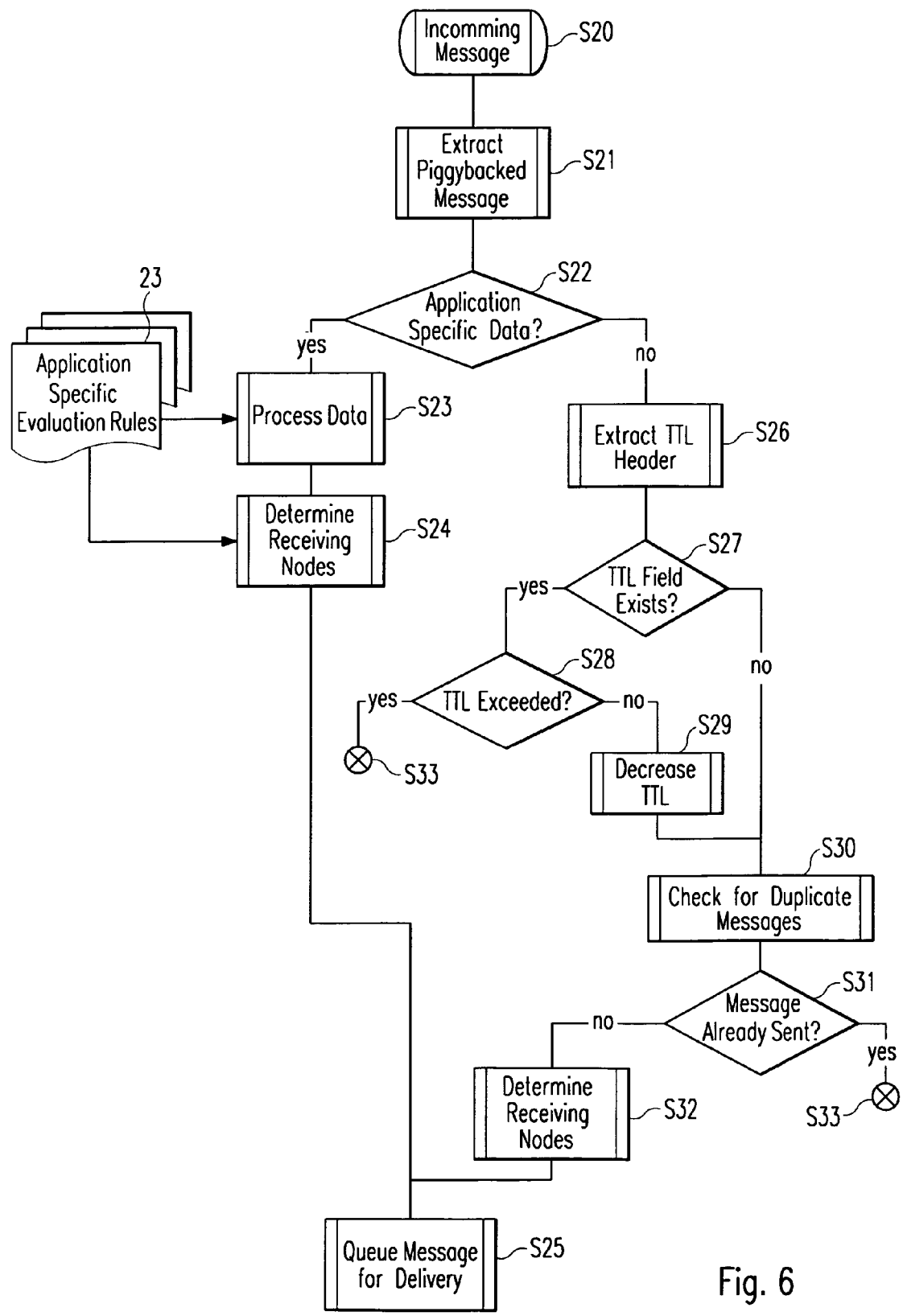
FIG. 6 is an illustration of the blend information.

For example, as shown in FIG. 6, image data 251 and 252 of photographed adjacent images include an overlapping area. When composite image data 253 is produced, blend information 254 is determined so that the pixel value of the overlapping area has a blend value of X % of the pixel value in the image data (designated camera image) 251 and Y % of the pixel value in the image data 252. Thus, a blend information value given by 255×X % is allocated to the overlapping area.

The blend information 254 corresponds to the coefficient indicating the ratio (weight W0) of the designated camera image, or the image data to be corrected, included in the pixel values of the image data regions.

In FIG. 5, the image data 202 is allocated the designated camera image data ratio (weight) W0=0, and the image data 201 is allocated the designated camera image data ratio (weight) W0=1.

As shown in FIG. 6, when an overlapping area is included and the overlapping area is subjected to blend processing, the overlapping area has a designated camera image data ratio (weight) W0 ranging from 0 to 1.

If the blend information 254 is set as grayscales 0 to 255, the blend information value is set to 0 (black) where the designated camera image data ratio (weight) W0=0, and the blend information value is set to 255 (white) where the designated camera image data ratio (weight) W0=1.

Referring back to FIG. 3, the blend information is determined in step S103, and the generated blend information is displayed in step S104. The displayed data is, for example, the blend information shown in FIG. 5 or the blend information 254 shown in FIG. 6.

The displaying step S104 is performed for confirmation of the operator, and may be omitted.

In the example described above, the blend information is set as image data having grayscale information associated with image data regions. The blend information does not necessarily have such an image data structure, and may have any structure in which a blend information value or a weighting information (W0) value is associated with each pixel of composite image data.

In step S105, in order to obtain pixel value information required for color correction, a representative point for pixel value adjustment (hereinafter referred to as a "representative point") is selected from each of reference image data and correction image (i.e., designated camera image) data.

Selection of a representative point will be described with reference to FIG. 7. As shown in FIG. 7, a representative point indicating a point at which the same color should be set is selected from each of a correction image (designated camera image) 201 and a reference image 202 of composite image data.

In FIG. 7, the point at which the same color should be set is included in a "sky" region of the photographed scene, and representative points 301 and 302 are selected from the correction image 201 and the reference image 202, respectively.

The representative point 301 in the correction image (designated camera image) 201 is specified by coordinates ($X_1$, $Y_1$), and the representative point 302 in the reference image 202 is specified by coordinates ($X_2$, $Y_2$), where X is the horizontal axis and Y is the vertical axis.

Selection of a representative point is performed by the operator while displaying composite image data on the display, or is automatically performed. The automatic selecting operation is described below. A plurality of sets of representative points may be selected.

In step S106, a transformed tone curve for use in pixel value correction for the correction image (designated camera image) 201 is generated.

A tone curve is a conversion table for use in color conversion of the overall image. A process for generating a transformed tone curve used for the pixel value correction in step S106 will be described with reference to FIGS. 8A and 8B.

Figure 8A:
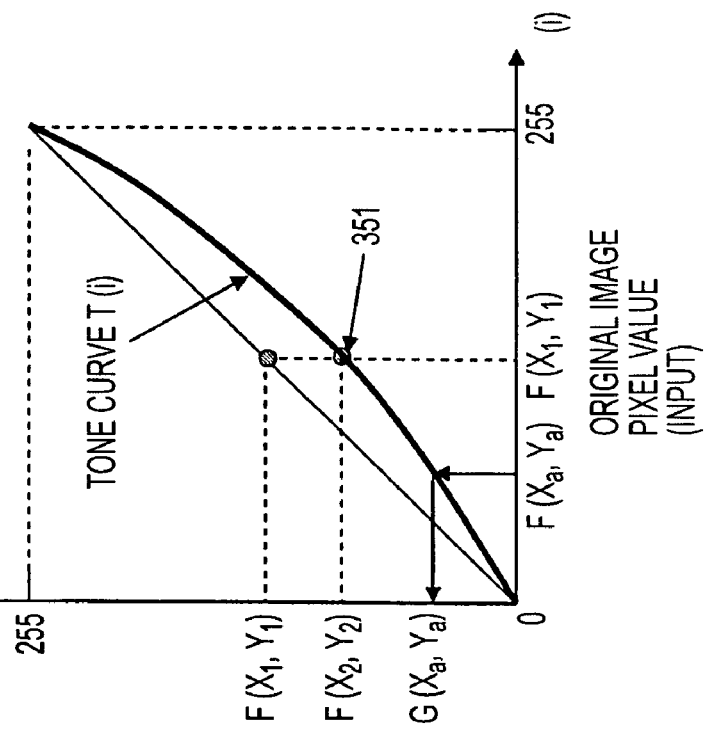
FIGS. 8A and 8B are graphs of a transformed tone curve for use in pixel value correction.

FIG. 8A shows a default tone curve $T_0(i)$ (i.e., input=output). The horizontal axis denotes the pixel value of the original image (input pixel value: Input), and the vertical axis denotes the pixel value of the converted image (output pixel value: Output). A "y=x" line indicates no conversion (that is, the original image), and this line is set as the default tone curve $T_0(i)$. When the default tone curve $T_0(i)$ is applied, the input pixel value is equal to the output pixel value. In this case, pixel value conversion is not carried out.

Figure 8B:
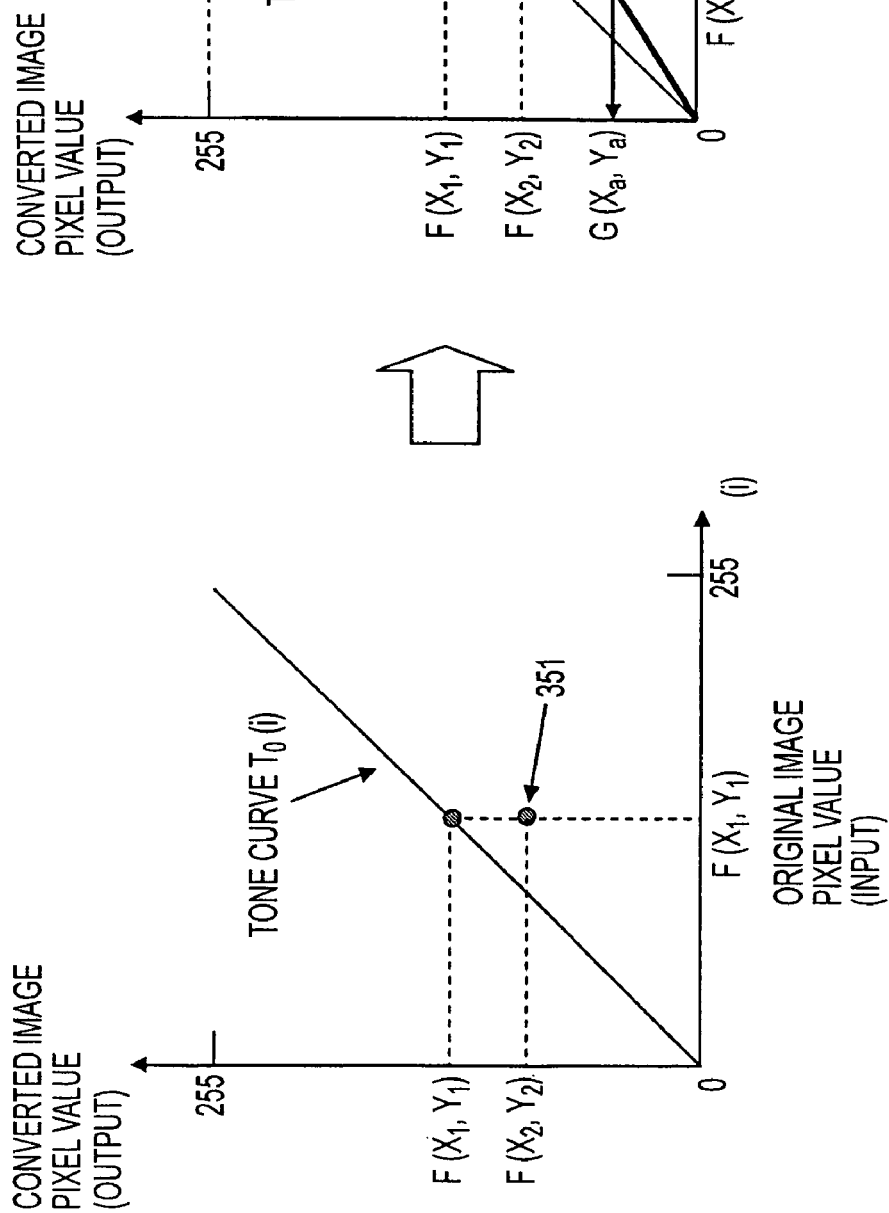

The pixel values at the representative points selected in step S105 are indicated by coordinates in FIGS. 8A and 8B.

The pixel value at the representative point ($x_1$, $y_1$) 301 in the correction image (designated camera image) 201 is indicated by $F(x_1, y_1)$, and the pixel value at the representative point ($x_2$, $y_2$) 302 in the reference image 202 is indicated by $F(x_2, y_2)$.

In order to match the pixel values at the two representative points, pixel value correction is performed. The pixel value at the representative point ($x_1$, $y_1$) 301 in the correction image (designated camera image) 201, i.e., $F(x_1, y_1)$, is corrected to the pixel value at the representative point ($x_2$, $y_2$) 302 in the reference image 202, i.e., $F(x_2, y_2)$.

Specifically, a tone curve that defines the output pixel value (Output) with respect to the input pixel value (Input) is transformed so that the input pixel value $F(x_1, y_1)$ at the representative point 301 is set to the output pixel value $F(x_2, y_2)$. That is, the tone curve is transformed into a tone curve that passes through the coordinate point ($F(x_1, y_1)$, $F(x_2, y_2)$) in the tone curve graph. Based on the transformed tone curve, pixel value conversion is performed.

Letting the pixel value conversion function based on the tone curve be T, the transformed tone curve should satisfy $T(F(x_1, y_1))=F(x_2, y_2)$.

In order to meet this condition, the default tone curve $T_0(i)$ shown in FIG. 8A is transformed so that the output value at the representative point ($x_1$, $y_1$) 301 in the correction image (designated camera image) 201 is set to $F(x_2, y_2)$. That is, the default tone curve $T_0(i)$ is transformed into a tone curve passing through the coordinate point (Input, Output)=($F(x_1, y_1)$, $F(x_2, y_2)$) in the tone curve graph, or a coordinate point 351 shown in FIG. 8A.

Pixel value conversion using the transformed tone curve prevents color variations at least at the selected representative point.

In order to coordinate the corrected color at the selected representative point with the colors of the surrounding regions, the default tone curve $T_0(i)$ (Input=Output) shown in FIG. 8A is transformed into a smooth tone curve T(i) shown in FIG. 8B that passes through a pixel-value-conversion coordinate point 351 ($F(x_1, y_1)$, $F(x_2, y_2)$) defined by the representative points.

An independent tone curve for each color of a color image is generated. For example, three independent tone curves for Y, U, and V are generated for a color image having Y, U, and V color components, or three independent tone curves for R, G, and B are generated for a color image having R, G, and B color components. The tone curve for each color is transformed into a smooth tone curve passing through a pixel-value-conversion coordinate point defined by a given set of representative points.

The pixel values of the correction image (designated camera image) data 201 are converted using the smooth tone curve T(i) shown in FIG. 8B that passes through the coordinate point 351 (F($x_1$, $y_1$), F($x_2$, $y_2$)) defined by the representative points 301 and 302. Thus, the output pixel value (Output) with respect to the input pixel values (Input) of each pixel using the tone curve T(i) is determined.

For example, as shown in FIG. 8B, if the pixel value (Input) of a given pixel in the correction image (designated camera image) data is indicated by F($x_a$, $y_a$), the output pixel value (Output) after correction is indicated by G($x_a$, $y_a$).

A specific process for transforming the default tone curve $T_0$(i) (Input=Output), or the "x=y" line shown in FIG. 8A, into the smooth tone curve T(i) shown in FIG. 8B that passes through the pixel-value-conversion coordinate points defined by the sets of representative point will be described.

The image conditions to be satisfied for color correction using a transformed tone curve include:

(1) the condition that colors at boundaries of a plurality of images be matched;

(2) the condition that a continuous color field be maintained; and (3) the condition that a change from the original image be minimized.

Condition (1) means that the tone curve passes through a pixel-value-conversion coordinate point defined by a specified set of representative points. In order to prevent color variations, condition (1) should be satisfied. Conditions (2) and (3) are necessary for obtaining a natural image after correction.

In order to satisfy condition (2), the transformed tone curve should be smooth. If the transformed tone curve is not smooth, e.g., if the transformed curve is a broken-line tone curve having a combination of straight lines, a continuously gradated portion of the original image will be converted into a discontinuous color field.

If condition (3) is not satisfied, or if the pixel value of the corrected image is greatly changed from the pixel value of the original image, for example, a yellow sky may be shown or an originally white wall may be shown as a black wall. In order to satisfy condition (3), a tone curve that is not greatly changed from the "y=x" line or the default tone curve is generated.

Several processes for generating a transformed tone curve will be described.

A tone curve transformation process using a spline curve will be described with reference to FIG. 9.

A spline curve is a smooth curve passing through designated control points. In view of a transformation process satisfying conditions (1) and (2) described above, interpolation of control points using a spline curve is applicable to a tone curve transformation process.

Figure 9:
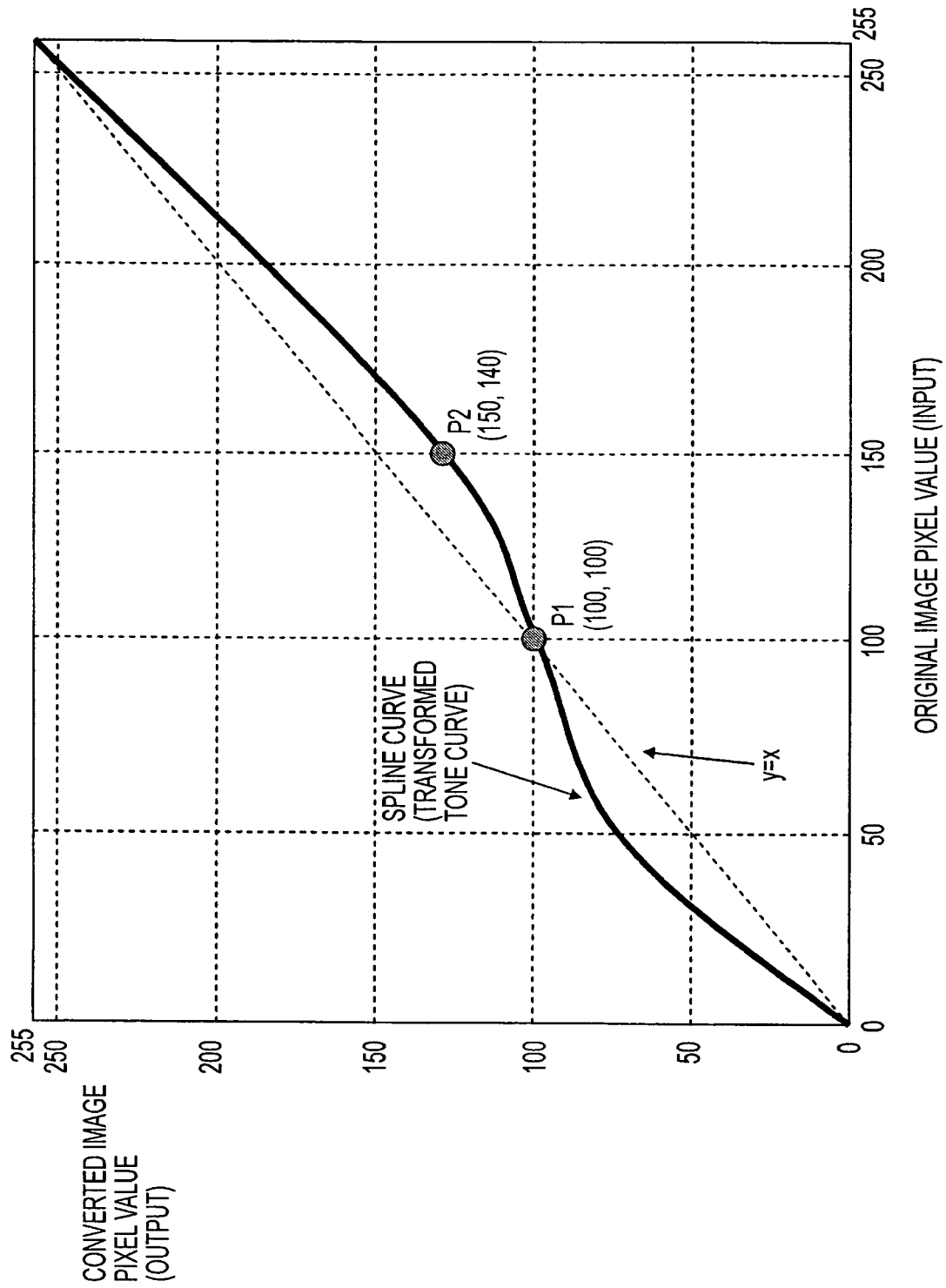
FIG. 9 is a graph of a transformed tone curve generated using a spline curve.

FIG. 9 is a tone curve graph showing a spline curve. The spline curve is plotted so that pixel-value-conversion coordinate points defined by two sets of representative points selected from a correction image (designated camera image) and an adjacent reference image of composite image data are set as control points P1 (100, 100) and P2 (150, 140). The spline curve passes through end points (0, 0) and (255, 255) and the control points P1 (100, 100) and P2 (150, 140). This spline curve is used as a transformed tone curve.

In this way, a spline curve in which a pixel-value-conversion coordinate point defined by a given set of representative points is set as a control point is plotted so as to pass through the control point, and is used as a transformed tone curve. This transformed tone curve satisfies at least conditions (1) and (2) described above.

In the tone curve transformation process described above with reference to FIG. 9, a single spline curve is used. A spline curve defined by a larger number of control points is more liable to oscillate.

Figure 10:
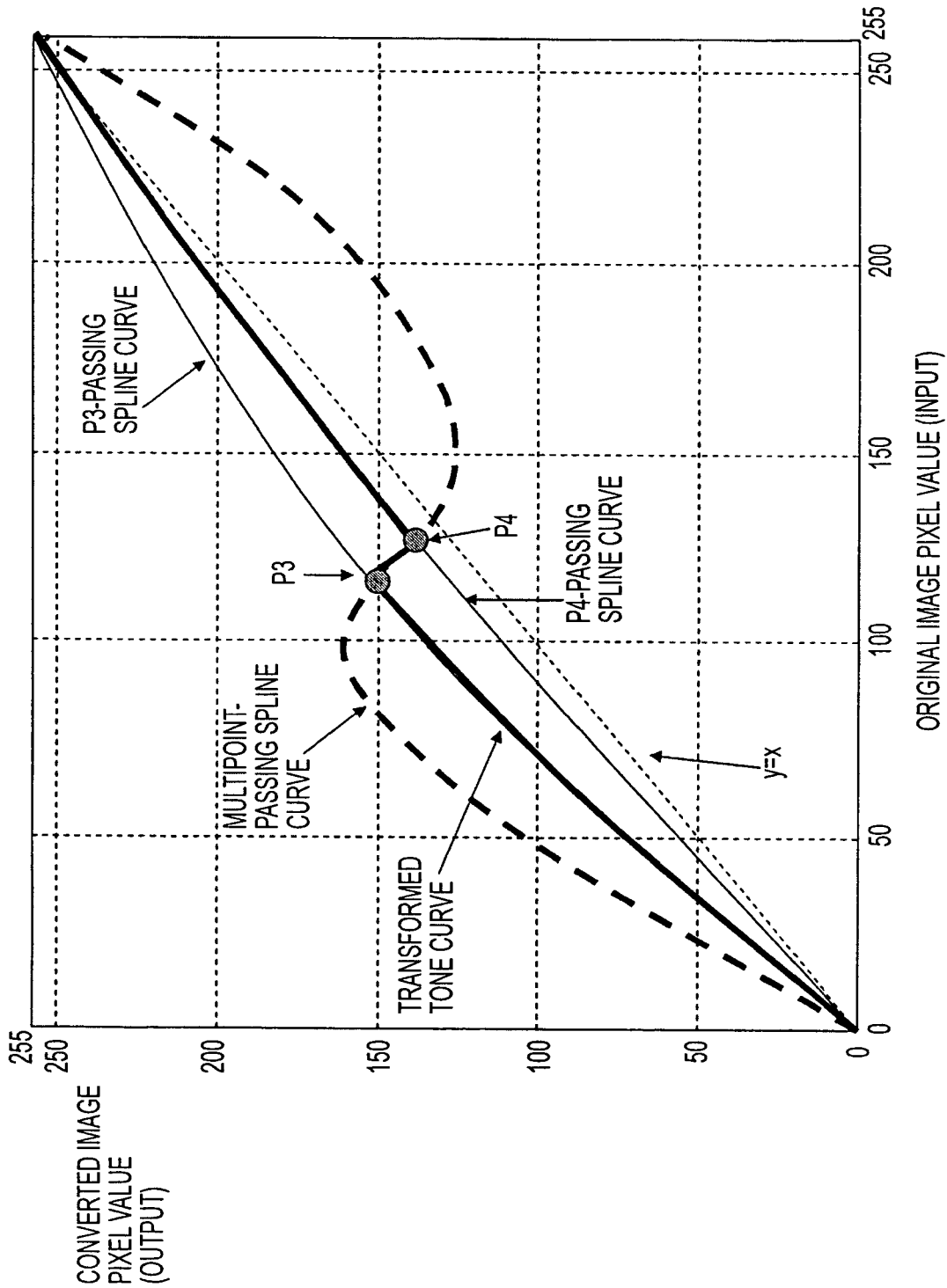
FIG. 10 is a graph of a transformed tone curve generated using a plurality of spline curves.

FIG. 10 is a graph showing a multipoint-passing spline curve (indicated by a dotted line) that is defined by two control points indicated by pixel-value-conversion coordinate points P3 (120, 150) and P4 (128, 140) defined by sets of representative points and that passes through the two control points and the end points (0, 0) and (255, 255).

The multipoint-passing spline curve shown in FIG. 10 is largely curved across the "y=x" line or the default tone curve.

If an image is converted using such a multipoint-passing spline curve as a transformed tone curve, the converted image is an unnatural image including clearly erroneous converted pixel values.

If a plurality of control points exist other than the end points (0, 0) and (255, 255), a transformed tone curve is not formed by a single spline curve passing through these control points but is formed by plotting a plurality of spline curves each passing through only one control point and the end points (0, 0) and (255, 255) and connecting these spline curves.

In FIG. 10, a P3-passing spline curve connecting the control point P3 (120, 150) and the end points (0, 0) and (255, 255), and a P4-passing spline curve connecting the control point P4 (128, 140) and the end points (0, 0) and (255, 255) are plotted, and the P3- and P4-passing spline curves are connected to generate a transformed tone curve.

From the origin (0, 0) to the control point P3 (120, 150), the spline curve (P3-passing spline curve) passing through the control point P3 (120, 150) and the end points (0, 0) and (255, 255) is used. From the control point P4 (128, 140) to the end point (255, 255), the spline curve (P4-passing spline curve) passing through the control point P4 (128, 140) is used.

The control points P3 and P4 are connected by weighting and averaging the P3- and P4-passing spline curves depending upon the distance from the control points P3 and P4. In this way, lines individually connecting a plurality of control points (coordinate points for pixel value conversion) are weighted and averaged depending upon the distance from the control points (coordinate points for pixel value conversion).

For example, letting the distance between the control point P3 (120, 150) and the control point P4 (128, 140) be L, the coordinates of a point a distance "a" apart from the control point P3 is defined by (xa, Ya)=((120×(L−a)/L)+128×a/L, (150×(L−a)/L)+140×a/L)). Then, the control point P3 (120, 150) and the control point P4 (128, 140) are connected.

Alternatively, the control point P3 (120, 150) and the control point P4 (128, 140) may be simply connected by a straight line.

A transformed tone curve generated using a combination of a plurality of spline curves is not smooth to some extent; however, an image converted using this transformed tone curve is not much changed from the original image, and satisfies condition (3) described above. Therefore, more natural pixel value correction is realized.

A single spline curve connecting a plurality of control points and the end points does not necessarily cause oscillation. However, if spline curves each passing through one control point and the end points are connected to generate a transformed tone curve, the generated transformed tone curve is similar to the single spline curve passing through the plurality of control points. Therefore, tone curve transformation using a combination of a plurality of spline curves is effective.

Figure 11:
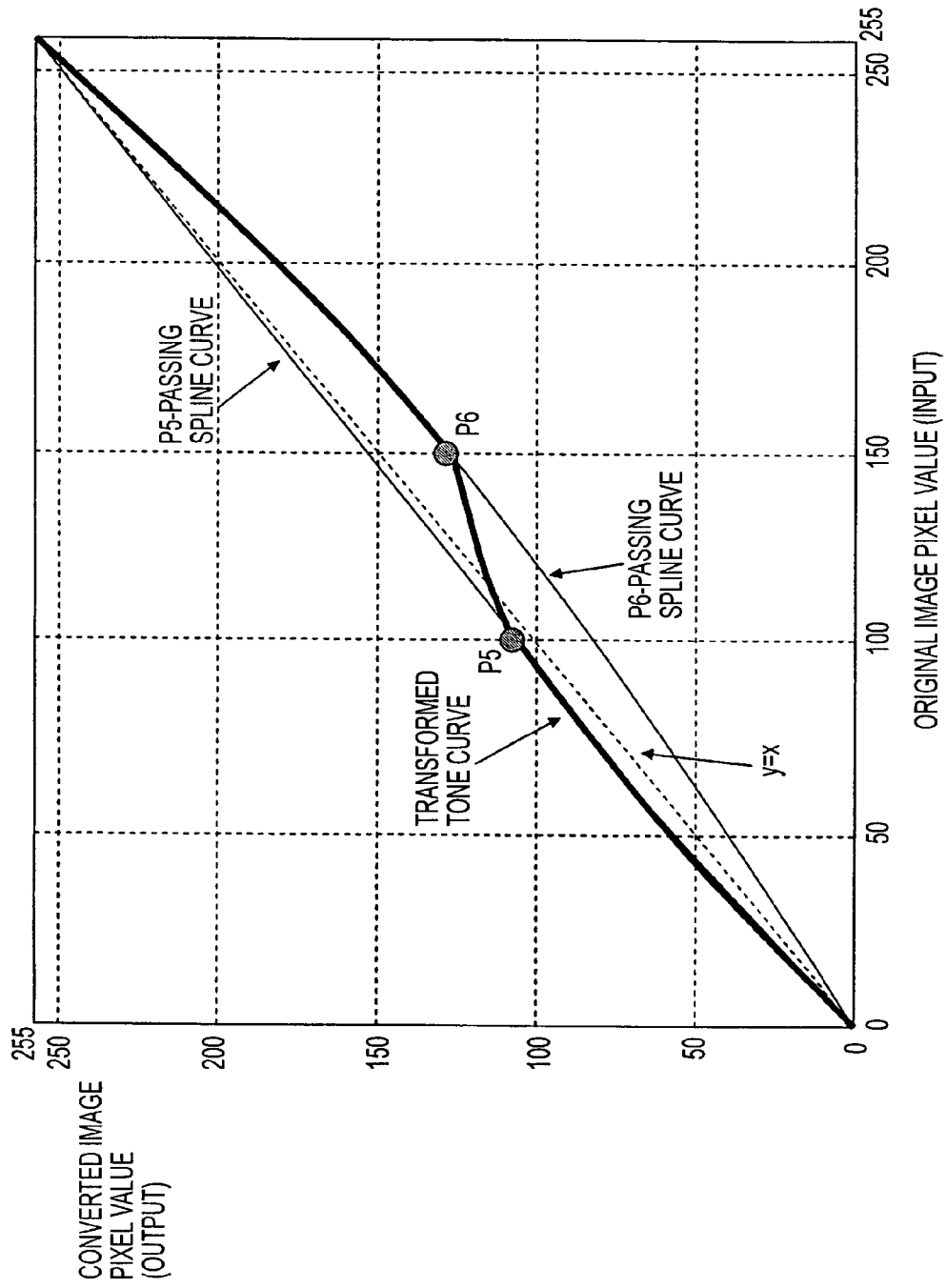
FIG. 11 is a graph of a transformed tone curve generated using a plurality of spline curves.

FIG. 11 shows a single spline curve connecting a plurality of control points and the end points, which does not cause oscillation. When a spline curve passing through a control point P5 and a spline curve passing through a control point P6 shown in FIG. 11 are connected to generate a transformed tone curve, the transformed tone curve is similar to a spline curve passing through the control points P5 and P6.

In this case, a single spline curve passing through the control points P5 and P6 may be directly used as a transformed tone curve, or a plurality of spline curves each passing through the control point P5 or P6 may be connected to generate a transformed tone curve.

Another tone curve transforming process is to simply connect control points by straight lines to generate a transformed tone curve. This process will be described with reference to FIG. 12.

Figure 12:
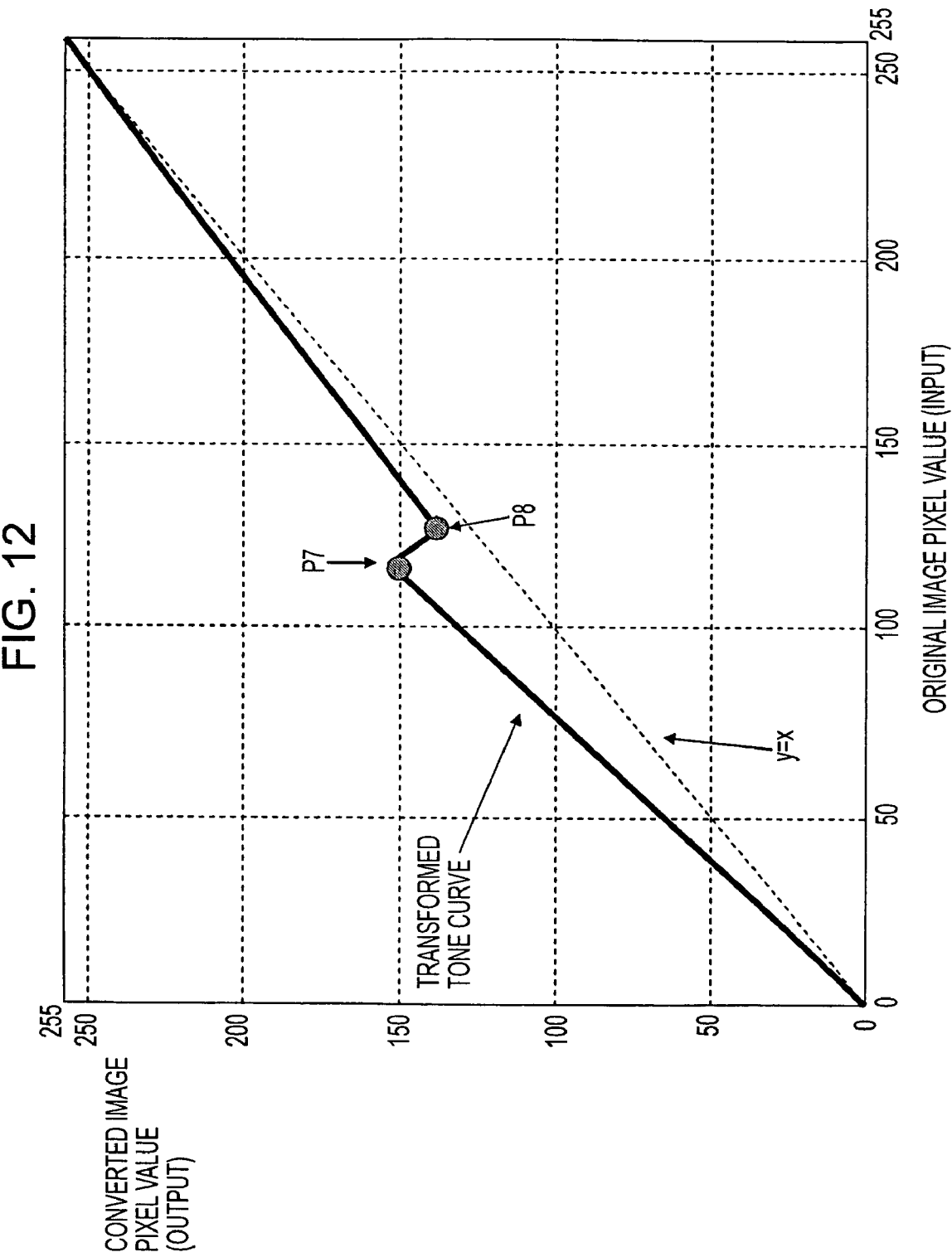
FIG. 12 is a graph of a transformed tone curve generated using a straight line connecting a plurality of points.

In FIG. 12, pixel-value-conversion coordinate points P7 and P8 are defined by two sets of representative points that are selected from correction image data (designated camera image) and an adjacent reference image of composite image data. The end point (0, 0) and the coordinate point P7, the coordinate points P7 and P8, and the coordinate point P8 and the end point (255, 255) are connected by individual straight lines. These straight lines are then connected to generate a transformed tone curve.

Although the generated transformed tone curve may cause less smooth conversion at the pixel-value-conversion coordinate point specified in the tone curve graph, the converted image substantially satisfies conditions (1) and (3).

Referring back to FIG. 3, in step S106, a transformed tone curve that defines an output pixel value with respect to an input pixel value is generated using any of the transformation processes described above.

In step S107, the pixel vale of a pixel of the correction image (designated camera image) 201 (see FIG. 5 or 7) is converted based on the transformed tone curve, and the output pixel value is determined.

More specifically, the pixel value of a pixel of the correction image (designated camera image) 201 is set to the X-axis of any of the tone curve graphs shown in FIGS. 9 to 12. The pixel value on the X-axis is converted using the transformed tone curve, and the converted value is determined.

Where the pixel value of a pixel $(x_\alpha, y_\alpha)$ of the correction image (designated camera image) 201 is denoted by $F(x_\alpha, y_\alpha)$, and a pixel value conversion function based on a transformed tone curve is denoted by T, the output pixel value $G(x_\alpha, y_\alpha)$ determined by conversion based on the transformed tone curve is given as follows:

$$G(x_\alpha, y_\alpha) = T(F(x_\alpha, y_\alpha))$$

In this way, the output pixel values of the pixels constituting the correction image (designated camera image) 201 are determined using the transformed tone curve. After the pixel value conversion, in step S108, a converted image in which the converted pixel values of the pixels constituting the correction image (designated camera image) 201 are set as the output pixel values is output. In this output image, the output pixel values of the pixels constituting the correction image (designated camera image) 201 are converted into the pixel values corresponding to the pixel values of the reference image 202, resulting in a high-quality seamless image.

Second Embodiment

An image processing apparatus according to a second embodiment of the present invention will be described. In the first embodiment, the output pixel values of the pixels constituting the correction image (designated camera image) 201 are uniformly corrected using a transformed tone curve.

In the second embodiment, the output pixel values of the pixels constituting the correction image (designated camera image) 201 are corrected using a transformed tone curve while changing the amount of correction depending upon the distance from the reference image 202.

The image processing apparatus of the second embodiment has a similar structure to that of the first embodiment described above with reference to FIG. 2.

Figure 13:
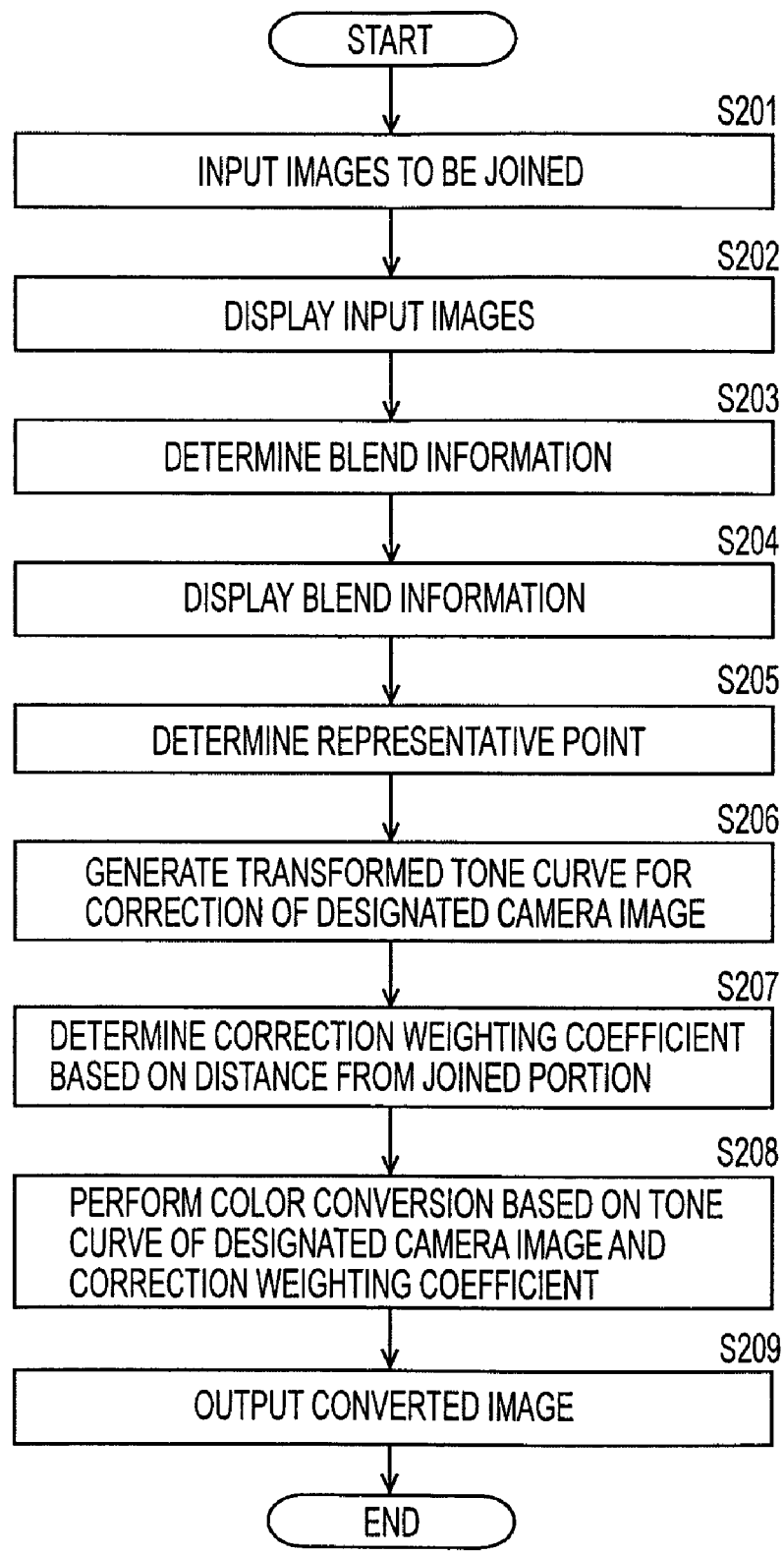
FIG. 13 is a flowchart showing an image processing process for the image processing apparatus according to a second embodiment of the present invention.

An image processing procedure according to the second embodiment will be described with reference to FIG. 13. In the procedure shown in FIG. 13, the tone curve transformation processing of steps S201 to S206 is similar to the processing of steps S101 to S106 shown in FIG. 3 of the first embodiment, and a description thereof is thus omitted.

In the second embodiment, a correction weighting coefficient determination process depending upon the distance from an image boundary of a composite image is performed in step S207, and pixel value conversion is performed in step S208 on a correction image (designated camera image) region of the composite image based on a transformed tone curve and the determined correction weighting coefficient.

In step S207, a correction weighting coefficient is determined depending upon the distance from a boundary between the correction image (designated camera image) 201 and the reference image 202. This process will be described in detail with reference to FIG. 14.

In a composite image shown in FIG. 14, the maximum correction weighting coefficient, i.e., 1, is set at the boundary between the correction image (designated camera image) 201 and the reference image 202, and the minimum correction weighting coefficient, i.e., 0, is set at the end of the correction image 201 farthest away from the boundary.

In step S208, correction is carried out based on a transformed tone curve in consideration of the correction weighting coefficient.

The coordinates of a give pixel of the correction image (designated camera image) 201 in the composite image are denoted by $(x_\alpha, y_\alpha)$, and the correction weighting coefficient for the given pixel is denoted by $w(x_\alpha, y_\alpha)$. The correction weighting coefficient $w(x_\alpha, y_\alpha)$ is set to a range of 0 to 1 depending upon the distance of the coordinates $(x_\alpha, y_\alpha)$ from the boundary with the reference image 202. That is, the correction weighting coefficient $w(x_\alpha, y_\alpha)$ is set to 1 at the boundary with the reference image 202, and the correction weighting coefficient $w(x_\alpha, y_\alpha)$ is set to 0 at the portion farthest away from the boundary with the reference image 202.

A transformed tone curve is generated by a similar method to that in the first embodiment. Any of the transformed tone curves shown in, for example, FIGS. 9 to 12 is generated in step S206.

The pixel value conversion function based on the transformed tone curve generated in step S206 is denoted by T. An input pixel value $F(x_\alpha, y_\alpha)$ of the given pixel of the correction image (designated camera image) 201 in the composite image is converted based on the correction weighting coefficient $w(x_\alpha, y_\alpha)$ and the pixel value conversion function T using the transformed tone curve, and the output pixel value $G(x_\alpha, y_\alpha)$ is determined.

The output pixel value $G(x_\alpha, y_\alpha)$ is given by the following equation:

$$G(x_\alpha, y_\alpha) = [w(x_\alpha, y_\alpha) \times T(F(x_\alpha, y_\alpha))] + [(1 - w(x_\alpha, y_\alpha)) \times F(x_\alpha, y_\alpha)]$$

Specifically, the pixel values at the boundary between the correction image 201 and the reference image 202 are fully converted using the transformed tone curve, while reducing the amount of conversion of the pixel values in a portion farther away from the boundary. In the pixel region farthest away from the boundary, pixel value conversion based on the transformed tone curve is not carried out, and the original pixel values of the correction image (designated camera image) 201 are set as the output pixel values.

After the pixel value conversion, in step S209, a converted image in which the converted pixel values of the pixels constituting the correction image (designated camera image) 201 are set as the output pixel values is output. In this output image, the converted output pixel values of the pixels constituting the correction image (designated camera image) 201 are the same as the pixel values of the reference image 202 at the boundary between the correction image 201 and the reference image 202, and the pixel values in a portion farther away from the boundary are closer to the original values of the correction image (designated camera image) 201. Thus, a high-quality seamless image is realized.

Third Embodiment

In the first and second embodiments, as described above with reference to FIG. 7, a representative point is selected by the operator. The composite image constituted by the correction image (designated camera image) 201 and the reference image 202 is shown on the display, and a point at which the same color should be set is selected from each of the correction image (designated camera image) 201 and the reference image 202 of the composite image data.

In the example shown in FIG. 7, a representative point at which the same color should be set is included in a "sky" region of the photographed scene. In FIG. 7, the representative point 301 ($X_1$, $Y_1$) is selected in the correction image (designated camera image) 201, and the representative point 302 ($X_2$, $Y_2$) is selected in the reference image 202.

In a third embodiment of the present invention, representative point selection is automatically performed. In a representative point selection process, an edge image corresponding to a composite image of the correction image (designated camera image) 201 and the reference image 202 is generated.

Figure 15A:
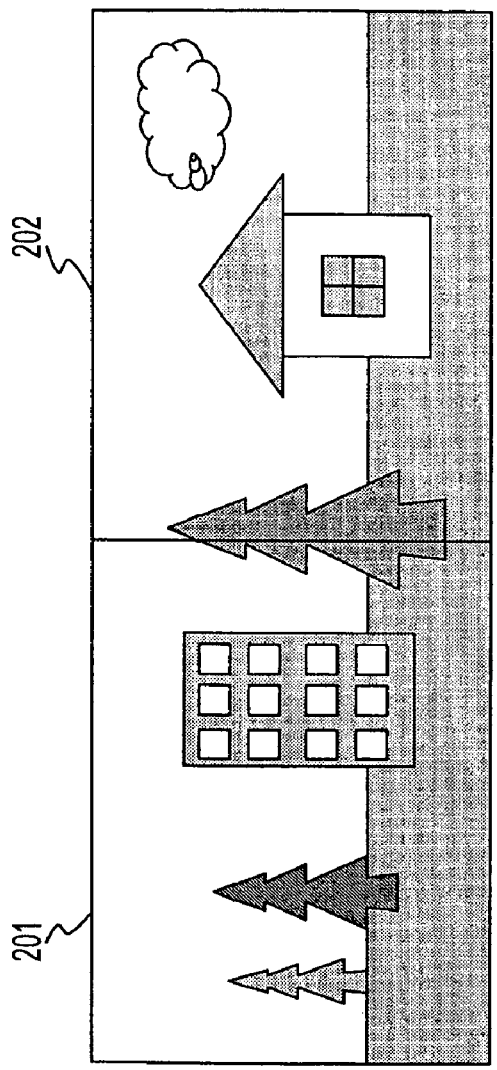
FIGS. 15A and 15B are illustrations of a composite image and an edge image.
Figure 15B:
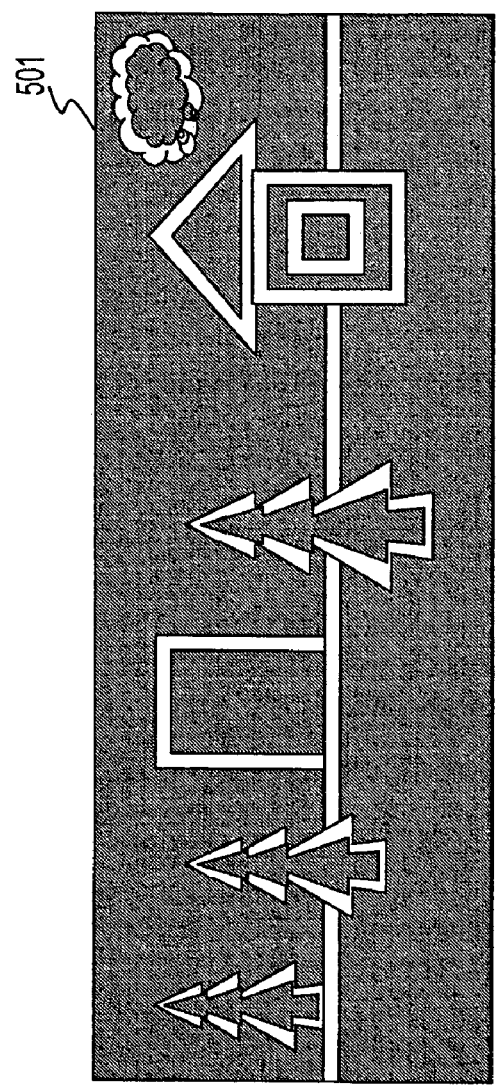

FIG. 15A shows a composite image of the correction image (designated camera image) 201 and the reference image 202, as in the first and second embodiments. FIG. 15B shows an edge image 501 corresponding to the composite image shown in FIG. 15A.

The edge image 501 is image data whose pixel region (edge region) including greatly changing pixel values is bright and whose textureless region without edges including less changing pixel values is dark. FIG. 15B is a schematic illustration of the edge image 501.

In the edge image 501 shown in FIG. 15B, for example, boundaries between tree portions and a sky portion are identified as edges with greatly changing pixel values, and are represented by white. The sky portion generally has a uniform pixel value, and is represented by black.

A representative point at which the same pixel value should be set is selected from each of the correction image (designated camera image) 201 and the reference image 202. In order to automatically select the representative points, points that are estimated to have the same pixel value are individually selected from the correction image (designated camera image) 201 and the reference image 202.

A region that possibly satisfies this condition is determined in the edge image 501. A region including no edges across the correction image (designated camera image) 201 and the reference image 202 is selected, and a representative point is then selected from the selected region.

This selection process will be described in detail with reference to FIG. 16. A boundary between the correction image (designated camera image) 201 and the reference image 202 is obtained based on blend information 502.

As described above with reference to FIG. 5, the blend information 502 is grayscale information having, for example, brightness values 0 to 255. The minimum brightness value 0 (i.e., black) is allocated to a reference image region, and the maximum brightness value 255 (i.e., white) is allocated to a designated camera image to be corrected. The blend information 502 is used to detect a boundary between the correction image (designated camera image) 201 and the reference image 202.

In the edge image 501, a region 551 around the boundary that does not include an edge across the correction image (designated camera image) 201 and the reference image 202 is selected, and a representative point is selected from the detected region 551. The region 551 may be a region having, for example, about 10% of the image width of each of the correction image and the reference image.

For example, if each of the correction image (designated camera image) 201 and the reference image 202 has 250 pixels in width, a region having a width within 25 pixels from the boundary may be selected as the region 551.

Preferably, an optimum area is determined in advance depending upon the degree of texture in the image to be processed, and the region 551 is selected from the determined optimum area.

With this selection technique, representative points that are estimated to have the same pixel value can automatically be selected individually from the correction image (designated camera image) 201 and the reference image 202 without representative point selection performed by the operator.

Figure 17:
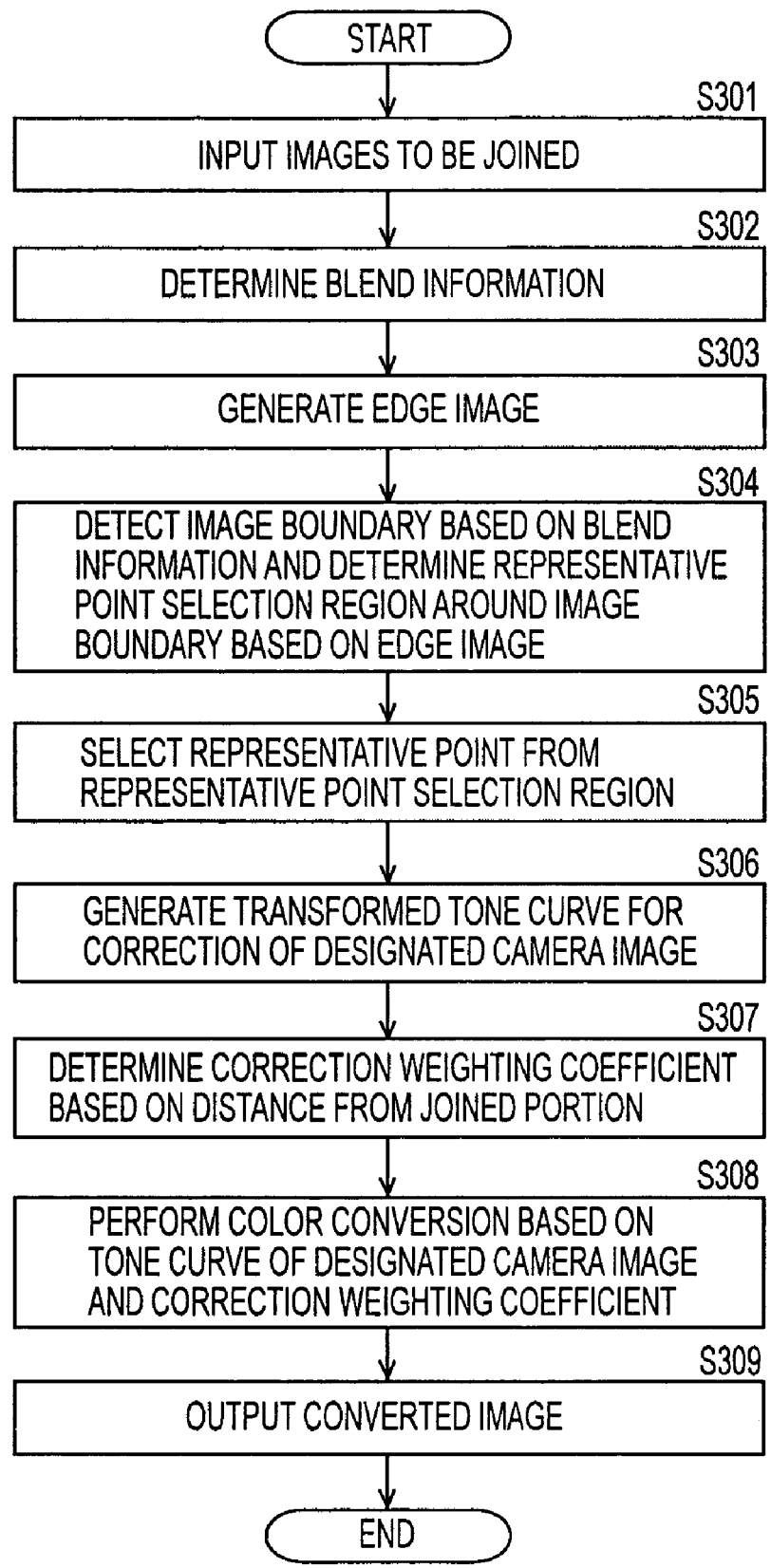
FIG. 17 is a flowchart showing an image processing process for the image processing apparatus according to a third embodiment of the present invention.

An image processing process for automatically selecting a representative point will be described with reference to FIG. 17. In the process shown in FIG. 17, the processing of steps S301 to S302 and the processing of steps S306 to S309 are common to those in the first or second embodiment, and a description thereof is thus omitted.

In steps S303 to S305, a representative point is automatically selected.

In step S303, an edge image corresponding to a composite image (see FIG. 15A) including a correction image (designated camera image) and a reference image is generated. For example, the edge image 501 shown in FIG. 15B is generated.

In step S304, an image boundary is detected based on the blend information (e.g., the blend information 502 shown in FIG. 16) generated in step S302, and a region around the image boundary that does not include an edge is determined based on the edge image. In this processing, the representative point selection region 551 shown in FIG. 16 is determined.

In step S305, a representative point is selected from each of the correction image (designated camera image) and the reference image within the representative point selection region.

A plurality of representative point selection regions may be selected in step S304, and in step S305, a plurality of representative points may individually be selected from the plurality of representative point selection regions.

The processing of steps S306 to S309 is similar to that in the first or second embodiment, and a description thereof is thus omitted.

Another automatic representative point selection process is to detect an image boundary based on blend information (e.g., the blend information 502 shown in FIG. 16) and to determine whether or not points selected around the image boundary with certain intervals are desired representative points.

This process will be described with reference to FIG. 18. First, a boundary between a correction image (designed camera image) 201 and a reference image 202 is detected based on the blend information 502 shown in FIG. 16.

Then, in each of the correction image (designed camera image) 201 and the reference image 202, it is determined whether or not points on a line a certain distance apart from the image boundary with predetermined pixel intervals are selectable as desired representative points.

Figure 18:
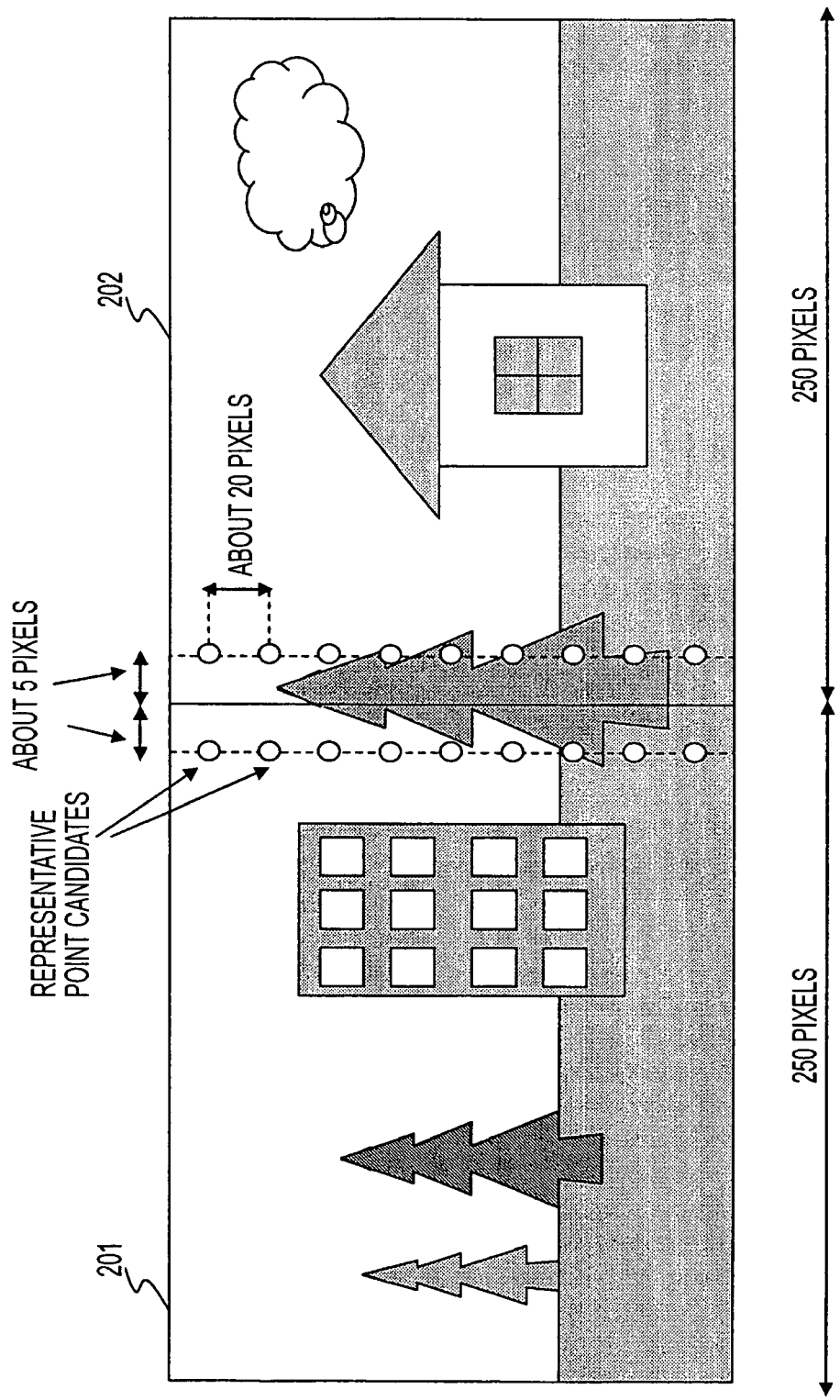
FIG. 18 is an illustration showing an automatic representative point selecting process in which it is determined whether or not representative point candidates with predetermined pixel intervals therebetween on a line a certain distance apart from an image boundary are selectable as representative points.

In FIG. 18, the correction image (designed camera image) 201 and the reference image 202 are image data each having 250 pixels in width. Points on a line five pixels apart from the image boundary are sequentially obtained from the top with 20-pixel intervals, and it is determined whether or not the obtained points are selectable as desired representative points. In order to determine whether or not each point is selectable as a desired representative point, it is determined whether or not the selected point in each of the correction image (designed camera image) 201 and the reference image 202 is included in a region including no edges in the edge image. This process allows a plurality of representative points to be automatically selected.

According to the third embodiment, representative points can automatically be selected without intervention of the operator, and a composite image formed by a plurality of images can be automatically corrected.

Therefore, a high-quality seamless mosaic image can be automatically generated without processing of the operator.

While the present invention has been described in detail with reference to the illustrated embodiments, it is to be understood that a variety of modifications and alternations of the illustrated embodiments may be made by those skilled in the art without departing from the scope of the present invention. The embodiments disclosed in the present invention are merely illustrative, and should not be restrictively construed. Consequently, reference should be made to the appended claims for precise delineation of the true scope of the present invention.

The series of processes described in this document may be implemented by hardware, software, or a combination thereof. If the series of processes is implemented by software, a program including the processes is installed in a memory of a computer incorporated in dedicated hardware and is executed, or the program is installed in a general-purpose computer capable of executing various processes and is executed.

The program may be stored in advance in a recording medium, such as a hard disk or a read-only memory (ROM). Alternatively, the program may be temporarily or persistently stored (recorded) in a removable recording medium, such as a flexible disk, a CD-ROM (Compact Disc Read Only Memory), an MO (Magneto-optical) disk, a DVD (Digital Versatile Disc), a magnetic disk, or a semiconductor memory. The removable recording medium may be offered as packaged software.

The program may be installed from the removable recording medium described above to the computer, or may be transferred from a download site to the computer wirelessly or via a line over a network such as a local area network (LAN) or the Internet. The computer receives the transferred program, and installs the received program in a recording medium such as a built-in hard disk.

The processes described in this document may be executed sequentially in the orders described, or may be executed in parallel or individually, as required, depending upon the capabilities of the apparatus that executes the processes. Throughout the document, the term system refers to a logical set of a plurality of apparatuses, and these apparatuses are not necessarily housed in the same housing.

What is claimed is:

1. An image processing apparatus that generates a mosaic image in which a plurality of images are connected, the mosaic image including a reference image and a correction image to be corrected, the apparatus comprising an image processing unit that corrects a pixel value of the correction image based on the reference image, wherein the image processing unit determines a tone curve that defines an output pixel value with respect to an input pixel value, and converts the pixel value of the correction image using the tone curve, the tone curve being generated so as to pass through a pixel-value-conversion coordinate point that is defined by a correction-image pixel value and a reference-image pixel value set as input and output values, the correction-image pixel value constituting a pixel-value-adjustment representative point that is selected from the correction image, the reference-image pixel value constituting a pixel-value-adjustment representative point that is selected from the reference image, the pixel-value-adjustment representative points selected from the correction image and the reference image being points at which the same pixel value is to be set, and the pixel value of the correction image is converted based on the generated tone curve.

2. The apparatus according to claim 1, wherein the image processing unit generates a spline curve that passes through the pixel-value-conversion coordinate point as a control point, and converts the pixel value of the correction image using the spline curve as a tone curve.

3. The apparatus according to claim 1, wherein the image processing unit generates a plurality of spline curves that individually pass through a plurality of pixel-value-conversion coordinate points, and converts the pixel value of the correction image based on a tone curve generated by connecting the plurality of spline curves.

4. The apparatus according to claim 1, wherein the image processing unit connects a plurality of pixel-value-conversion coordinate points by a line to generate a tone curve, and converts the pixel value of the correction image based on the generated tone curve.

5. The apparatus according to claim 1, wherein the image processing unit generates coordinate-point connecting lines individually connecting a plurality of pixel-value-conversion coordinate points by weighting and averaging depending upon the distance from the pixel-value-conversion coordinate points, and converts the pixel value of the correction image based on a tone curve including the generated coordinate-point connecting lines.

6. The apparatus according to claim 1, wherein the image processing unit generates a correction weighting coefficient for a pixel value of the correction image depending upon the distance from a connected portion with the reference image, and changes the amount of pixel value conversion based on the tone curve according to the correction weighting coefficient, and the amount of pixel value conversion based on the tone curve is reduced for a pixel value of the correction image farther away from the connected portion with the reference image.

7. The apparatus according to claim 6, wherein the image processing unit determines an output pixel value $G(x_\alpha, y_\alpha)$ of the correction image by the following equation:

$$G(x_\alpha, y_\alpha)=[w(x_\alpha, y_\alpha) \times T(F(x_\alpha, y_\alpha))]+[(1-w(x_\alpha, y_\alpha)) \times F(x_\alpha, y_\alpha)]$$

where $F(x_\alpha, y_\alpha)$ denotes an input pixel value of the correction image, $w(x_\alpha, y_\alpha)$ denotes the correction weighting coefficient for each pixel of the correction image, and T denotes a pixel value conversion function using the tone curve.

8. The apparatus according to claim 1, wherein the image processing unit detects an identical-pixel-value-setting region based on an edge image, and selects the pixel-value-adjustment representative points from the detected identical-pixel-value-setting region, the identical-pixel-value-setting region being a region where the same pixel value can be set in the correction image and the reference image, the edge image corresponding to the image in which the reference image and the correction image are connected.

9. An image processing method for generating a mosaic image in which a plurality of images are connected, the mosaic image including a reference image and a correction image to be corrected, the method comprising:

a tone curve determining step of determining a tone curve that defines an output pixel value with respect to an input pixel value, the tone curve being generated by a line that passes through a pixel-value conversion coordinate point that is defined by a correction-image pixel value and a reference-image pixel value set as input and output values, the correction-image pixel value constituting a pixel-value-adjustment representative point that is selected from the correction image, the reference-image pixel value constituting a pixel-value-adjustment representative point that is selected from the reference image, the pixel-value-adjustment representative points selected from the correction image and the reference image being points at which the same pixel value is to be set; and a pixel value converting step of converting the pixel value of the correction image based on the tone curve.

10. The method according to claim 9, wherein the tone curve determining step determines a spline curve that passes through the pixel-value-conversion coordinate point as a control point, and the pixel value converting step converts the pixel value of the correction image using the spline curve as a tone curve.

11. The method according to claim 9, wherein the tone curve determining step determines a plurality of spline curves that individually pass through a plurality of pixel-value-conversion coordinate points, and generates a tone curve by connecting the plurality of spline curves, and the pixel value converting step converts the pixel value of the correction image based on the generated tone curve.

12. The method according to claim 9, wherein the tone curve determining step connects a plurality of pixel-value-conversion coordinate points by a line to generate a tone curve, and the pixel value converting step converts the pixel value of the correction image based on the generated tone curve.

13. The method according to claim 9, wherein the tone curve determining step generates coordinate-point connecting lines individually connecting a plurality of pixel-value-conversion coordinate points by weighting and averaging depending upon the distance from the pixel-value-conversion coordinate points, and generates a tone curve including the generated coordinate-point connecting lines, and the pixel value converting step converts the pixel value of the correction image based on the generated tone curve.

14. The method according to claim 9, further comprising the steps of:

generating a correction weighting coefficient for a pixel value of the correction image depending upon the distance from a connected portion with the reference image; and changing the amount of pixel value conversion based on the tone curve according to the correction weighting coefficient, wherein the amount of pixel value conversion based on the tone curve is reduced for a pixel value of the correction image farther away from the connected portion with the reference image.

15. The method according to claim 14, further comprising the step of:

determining an output pixel value $G(x_\alpha, y_\alpha)$ of the correction image by the following equation:

$$G(x_\alpha, y_\alpha)=[w(x_\alpha, y_\alpha) \times T(F(x_\alpha, y_\alpha))]+[(1-w(x_\alpha, y_\alpha)) \times F(x_\alpha, y_\alpha)]$$

where $F(x_\alpha, y_\alpha)$ denotes an input pixel value of the correction image, $w(x_\alpha, y_\alpha)$ denotes the correction weighting coefficient for each pixel of the correction image, and T denotes a pixel value conversion function using the tone curve.

16. The method according to claim 9, further comprising the steps of:

detecting an identical-pixel-value setting region based on an edge image, the identical-pixel-value-setting region being a region where the same pixel value can be set in the correction image and the reference image, the edge image corresponding to the image in which the reference image and the correction image are connected; and selecting the pixel-value-adjustment representative points from the detected identical-pixel-value-setting region.

17. A computer-readable medium comprising instructions which, when executed by a processor, perform a method for generating a mosaic image in which a plurality of images are connected, the mosaic image including a reference image and a correction image to be corrected, the method including:

determining a tone curve that defines an output pixel value with respect to an input pixel value, the tone curve being generated by a line that passes through a pixel-value-conversion coordinate point that is defined by a correction-image pixel value and a reference-image pixel value set as input and output values, the correction-image pixel value constituting a pixel-value-adjustment representative point that is selected from the correction image, the reference-image pixel value constituting a pixel-value-adjustment representative point that is selected from the reference image, the pixel-value-adjustment representative points selected from the correction image and the reference image being points at which the same pixel value is to be set; and converting the pixel value of the correction image based on the tone curve.

* * * * *